(12) United States Patent
Imai

(10) Patent No.: US 7,312,938 B2
(45) Date of Patent: Dec. 25, 2007

(54) OPTICAL COMPONENT RETAINING DEVICE, OPTICAL COMPONENT AND HOUSING

(75) Inventor: Satoshi Imai, Kanagawa (JP)

(73) Assignee: Sony Corporation (JP)

( * ) Notice: Subject to any disclaimer, the term of this patent is extended or adjusted under 35 U.S.C. 154(b) by 155 days.

(21) Appl. No.: 11/044,277

(22) Filed: Jan. 28, 2005

(65) Prior Publication Data

US 2005/0196125 A1 Sep. 8, 2005

(30) Foreign Application Priority Data

Feb. 20, 2004 (JP) .................. P2004-044832

(51) Int. Cl.
*G02B 7/02* (2006.01)
(52) U.S. Cl. .................. 359/819; 359/811; 359/813; 359/821
(58) Field of Classification Search ................ 359/819, 359/811, 813, 821, 822, 823
See application file for complete search history.

(56) References Cited

U.S. PATENT DOCUMENTS

| | | | |
|---|---|---|---|
| 2,936,672 A | 5/1960 | May et al. | |
| 5,216,549 A | 6/1993 | Notagashira et al. | |
| 5,264,887 A | 11/1993 | Fukahori | |
| 6,078,754 A | 6/2000 | DiRisio | |
| 6,283,644 B1 * | 9/2001 | Gilliland et al. | 385/93 |
| 7,099,090 B2 * | 8/2006 | Daikoku | 359/719 |

FOREIGN PATENT DOCUMENTS

| | | |
|---|---|---|
| JP | 62-039808 | 2/1987 |
| JP | 62-142714 | 9/1987 |
| JP | 2000-214365 | 8/2000 |
| JP | 2002-090852 | 3/2002 |
| JP | 2002-365698 | * 8/2002 |

OTHER PUBLICATIONS

EPO Search Report mailed May 31, 2005.
Japanese Office Action: Application No.: 2004-044832: Dated: Feb. 13, 2007.

* cited by examiner

*Primary Examiner*—Ricky Mack
*Assistant Examiner*—Brandi Thomas
(74) *Attorney, Agent, or Firm*—Rader Fishman & Grauer PLLC; Ronald P. Kananen

(57) ABSTRACT

The present invention provides an optical component retaining device which includes an eyepiece lens 15 having a pair of rib portions 15b and 15c and a housing 16 having a slit portion 28 made of a tapered groove where the pair of rib portions are inserted and retains the eyepiece lens in the housing by holding the pair of rib portions in the slit portion. First to third planar surfaces 31b through 33b to be reference surfaces are arranged at three locations on one side surface of the pair of rib portions 15b and 15c in the light axis direction of the eyepiece lens 15 and convex portions 34 and 35 to be pressing portions are arranged at a plurality of locations on the other side surface of the pair of rib portions in the light axis direction. Further, first to third reception surfaces 47a through 79b to be first supporting surfaces are arranged at three locations on one side surface of the slit portion 28 corresponding to the reference surfaces of three locations and convex portion reception surfaces 47b and 49c to be second supporting surfaces are arranged at a plurality of locations on the other side surface of the slit portion.

14 Claims, 13 Drawing Sheets

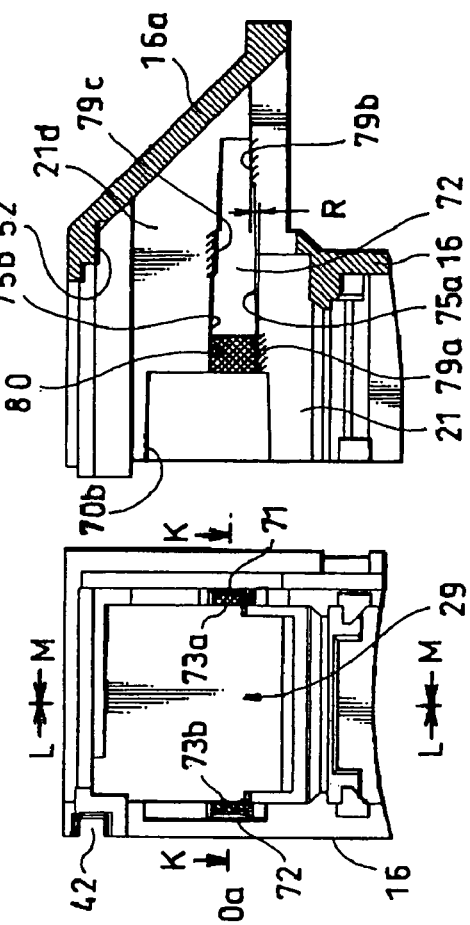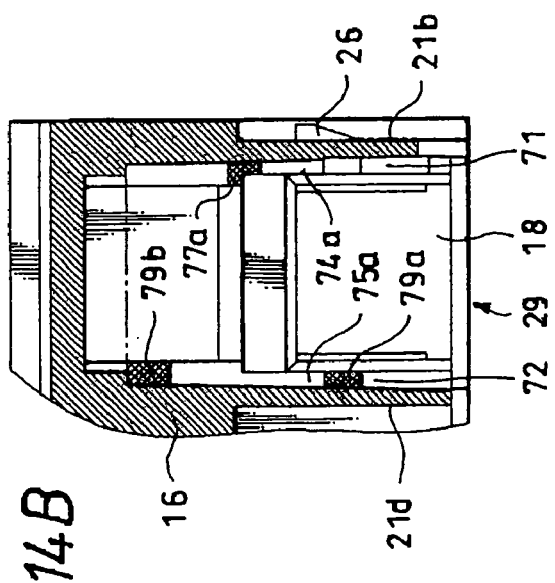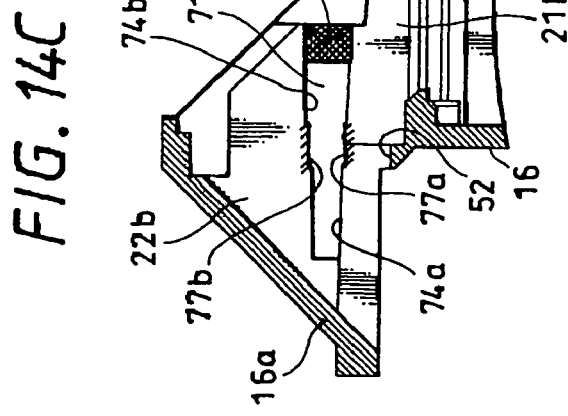

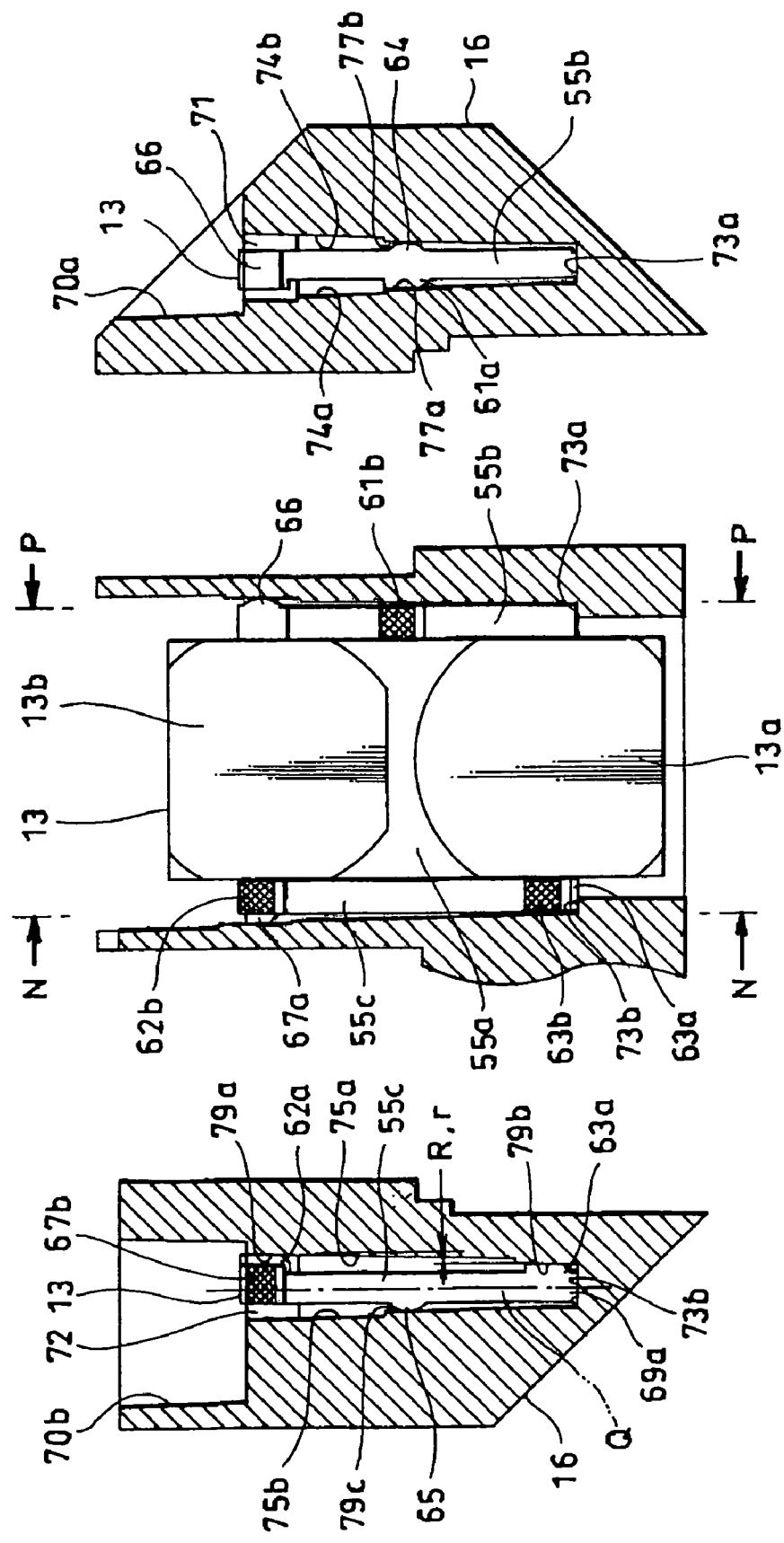

OPTICAL COMPONENT RETAINING DEVICE, OPTICAL COMPONENT AND HOUSING

BACKGROUND OF THE INVENTION

1. Field of the Invention

The present invention relates to an optical component retaining device which retains an optical component such as a lens, a prism and a filter, an optical component and a housing which is suitable for retaining the optical component; and particularly relates to an optical component retaining device with which an optical component used for a view finder, a lens device and the like which are used for an electronic device such as a still camera and a video camera can be installed with high accuracy and yet with ease to the main body of an electronic device, an optical component and a housing.

2. Description of the Related Art

As a conventional optical component retaining device of this kind, there is the one described in Patent reference 1, for example. In the patent reference 1, there is a description relating to a camera in which an assembly of a finder is simplified. The camera described in this patent reference 1 includes a camera main body portion in which a photographing mechanism is assembled and a front cover and a rear cover which are assembled in such a manner as to cover this camera main body portion from the front and from the rear, respectively. In this camera, after a finder unit made of a frame body, in which a finder optical system including an objective lens and an eyepiece lens is assembled, is directly retained by either an inner surface of the front cover or that of the rear cover, the finder unit is covered with the remaining other cover to be held from the front and the rear, and the above objective lens and eyepiece lens are exposed from an objective window formed in the front cover and from an eyepiece window formed in the rear cover, respectively.

According to the camera having such structure, since the finder unit separated from the camera main body portion is held from the front and the rear by using the front cover and the rear cover constituting exterior cladding, the finder unit can be positioned directly with respect to the covers and an assembly can be performed easily in an accurate position. Further, since a projection for stably retaining the finder unit is formed on the cover side, there is effectiveness that the finder does not drop off after assembled.

Further, as another example of the optical component retaining device of this kind, there is also the one described in the patent reference 2, for example. In the patent reference 2, there is a description relating to an optical component retaining technology which is performed by using a retaining device integrally formed. The optical component retaining device described in this patent reference 2 is the one including a concave portion integrally formed, in which the concave portion has a retaining portion provided with at least a pair of parallel surfaces to retain an optical component.

According to the optical component retaining device having such structure, since the concave portion has the retaining portion provided with at least a pair of parallel surfaces to retain the optical component, an optical component having parallel lateral surfaces, for example, can reliably be held without using such means as a spring, so that the costs of components can be reduced. In addition, since the optical component can be held surely without using adhesive and the like, the optical component can easily be detached from the concave portion.

[Patent reference 1] Japanese Published Patent Application No. 2002-90852
[Patent reference 2] Japanese Published Patent Application No. 2000-214365

However, in a conventional optical component retaining device such as those described above; in the case of the former patent reference 1, since the position is determined by inserting a rib of lens into a slit portion of a housing and this housing is formed by injection molding, a draft angle has been required in the slit portion due to a structural reason of a mold of the housing. Accordingly, when the draft angle is formed on the whole surface of the slit portion to make the whole surface of an engaging portion fit and contact, there has been such a problem that corrections to a draft surface of the mold are difficult and finishing adjustment with high positional accuracy can not be performed at the time of assembly.

The above problem can be solved by using technologies such as a method of installing a lens by applying force with a spring or a method of eliminating an influence of a draft angle by making a mold of a housing into a slide structure as described in the latter patent reference 2. However, in both cases there remain such problems that the retaining device is uneconomical due to the increase in the number of components and the structure of the mold becomes complicated.

The problems to be solved by the present invention are that a conventional optical component retaining device has a large number of parts and also has the structure of a mold complicated to be uneconomical, as well as that the productivity of an optical component and a housing are not favorable.

SUMMARY OF THE INVENTION

An aspect of the present invention is an optical component retaining device which includes an optical component having a pair of rib portions and a housing having a slit portion made of a tapered groove where the pair of rib portions are inserted and in which the optical component is retained by holding the pair of rib portions by means of the slit portion in the housing; wherein reference surfaces extended in a parallel direction with an insertion direction are arranged at three locations on one side surface of the pair of rib portions in the light axis direction of the optical component and pressing portions are arranged at a plurality of locations on the other side surface of the pair of rib portions in the light axis direction; and first supporting surfaces extended in the parallel direction with the insertion direction in contact with the reference surfaces are arranged at three locations on one side surface of the slit portion corresponding to the reference surfaces of the three locations and second supporting surfaces extended in the parallel direction with the insertion direction in contact with the pressing portions are arranged at a plurality of locations on the other side surface of the slit portion.

Another aspect of the present invention is an optical component retaining device as described, in which the reference surfaces of two locations among the reference surfaces of three locations are arranged in one rib portion of the pair of rib portions on both ends thereof in the direction in which the rib portion extends, and the pressing portions are arranged in the middle of the direction in which the rib portion extends.

Another aspect of the present invention is an optical component retaining device as described, in which a level difference is provided between the reference surfaces of two locations when those reference surfaces of two locations overlap each other in the direction in which the rib portion extends; and this level difference is provided such that a distance from the center of the rib portion is made longer on an opening side of the slit portion than on a back side thereof.

Still another aspect of the present invention is an optical component retaining device as described, in which the optical component is any one of a lens, a prism, a filter and a mirror, which includes an optical component main body to transmit or to reflect light and a pair of rib portions arranged on both sides of the light axis with the optical component main body in between.

Another aspect of the present invention is an optical component retaining device as described, in which the pressing portion has a semi-cylindrical shape, a semispherical shape, a conical shape, a pyramid shape, a truncated conical shape, a truncated pyramid shape, a cylindrical shape or a polygonal cylindrical shape.

A further aspect of the present invention is an optical component retaining device as described, in which the optical component is any one of a lens, a prism, a filter and a mirror, which is used for an optical view finder.

Another aspect of the present invention is an optical component including: an optical component main body which transmits or reflects light and a pair of rib portions provided on both sides of a light axis with the optical component main body in between, in which reference surfaces extended in a parallel direction with a direction in which the rib portion extends are arranged at three locations on one side surface of a pair of rib portions of the optical component main body in the light axis direction, and pressing portions are arranged at a plurality of locations on the other side surface of the pair of rib portions.

Still another aspect of the present invention is an optical component as described, in which the reference surfaces of two locations among the reference surfaces of three locations are arranged in one rib portion of the pair of rib portions on both ends thereof in the direction in which the rib portion extends, and the pressing portions are arranged in the middle of the direction in which the rib portion extends.

Another aspect of the present invention is an optical component as described, in which a level difference is provided between the reference surfaces of two locations when those reference surfaces of two locations overlap each other in the direction in which the rib portion extends; and this level difference is provided such that a distance from the center of the rib portion is made longer on an opening side of the slit portion than on a back side thereof.

Still another aspect of the present invention is an optical component as described, in which an optical component is any one of a lens, a prism, a filter and a mirror.

Another feature of the present invention is an optical component as described, in which the pressing portion has a semi-cylindrical shape, a semispherical shape, a conical shape, a pyramid shape, a truncated conical shape, a truncated pyramid shape, a cylindrical shape or a polygonal cylindrical shape.

Another aspect of the present invention is a housing that includes a slit portion made of a tapered groove where a pair of rib portions are inserted, in which first supporting surfaces extended in a parallel direction with the insertion direction are arranged at three locations on one side surface of this slit portion and second supporting surfaces extended in the parallel direction with the insertion direction are arranged in a plurality of locations on the other side surface of the slit portion.

Still another aspect of the present invention is a housing as described, in which the first supporting surfaces of two locations among the first supporting surfaces of three locations are arranged on both ends of the slit portion in the insertion direction, and the second supporting surfaces are arranged in the middle of the insertion direction.

Another aspect of the present invention is a housing as described, in which a level difference is provided between the first supporting surfaces of two locations when those first supporting surfaces of two locations overlap each other in the insertion direction; and this level difference is provided such that a distance from the center of the slit portion is made longer on an opening side than on a back side.

According to the optical component retaining device of the present application, when a pair of rib portions of the optical component is inserted into the slit portion of the housing, the reference surfaces of three locations arranged on one side surface of the pair of rib portions come in contact with the first supporting surfaces of three locations arranged in the slit portion and also the pressing portions of a plurality of locations arranged on the other side surface of the pair of rib portions come in contact with the second supporting surfaces of a plurality of locations arranged in the slit portion. In this case, the reference surfaces of three locations arranged on one side surface of the pair of rib portions of the optical component come in contact with the first supporting surfaces of three locations arranged in the slit portion of the housing and the pressing portions of the plurality of locations arranged on the other side surface come in contact with the second supporting surfaces of the plurality of locations arranged in the slit portion. As a result, since those reference surfaces, the first supporting surfaces and the second supporting surfaces are formed with high accuracy, location adjustment of the pair of rib portions to a predetermined position of the slit portion can be performed automatically at the time of assembly and highly accurate positioning can easily be performed without requiring high accuracy in the shape and dimension of the whole of the pair of rib portions and slit portion.

Further, regarding a mold to manufacture the optical component having the pair of rib portions and the housing having the slit portion, since the accuracy in its shape and dimension can not strictly be required to some extent except for the reference surfaces, the first supporting surfaces and the second supporting surfaces, corrections of the mold can be performed easily and cost can be reduced with respect to the optical component and the housing by reducing expenses required for the mold. Furthermore, since the reference surfaces of three locations arranged on one side surface of the pair of rib portions are held at three points by the first supporting surfaces of three locations of the slit portion and also the pressing portions of a plurality of locations arranged on the other side surface of the pair of rib portions, which is the opposite side, are held by the second supporting surfaces of a plurality of locations of the slit portion, positioning of the optical component can be performed automatically by pushing the optical component into the slit portion and highly accurate positioning can be performed easily.

According to the optical component of the present application, since the reference surfaces are arranged at three locations on one side surface of a pair of rib portions which are arranged on the both sides of the optical component main body and the pressing portions are arranged in a plurality of locations on the other side surface, highly accurate positioning can be performed easily with a comparatively simple structure. A lens, a prism, a filter or a mirror can be such an optical component. By using those optical components for an optical view finder, for example, the retaining structure of the optical component can be simplified and the whole of the optical component retaining device can be miniaturized and simplified regarding the structure. Furthermore, since the pressing portion has any one of a semi-cylindrical shape, a semispherical shape, a conical shape, a pyramid shape, a truncated conical shape, a truncated pyramid shape, a cylindrical shape and a polygonal cylindrical shape, an optical component which is easy to be pushed into the slit portion and in which highly accurate positioning can easily be performed can be obtained.

According to the housing of the present invention, since the housing has the structure in which the first supporting surfaces are arranged at three locations on one side surface of the slit portion made of the tapered groove and the second supporting surfaces are arranged at a plurality of locations on the other side surface, a housing for retaining an optical component in which highly accurate positioning can be performed easily with a comparatively simple structure can be provided. By using this housing, it is possible to simplify the retaining structure of the optical component which has a shape and structure corresponding thereto, and accordingly, the miniaturization of the whole optical component retaining device and the simplification of the structure thereof can be achieved.

BRIEF DESCRIPTION OF THE DRAWINGS

FIGS. 8A to 8E are views showing a lens as a first embodiment of the optical component according to the present invention, in which FIG. 8A is a front view; FIG. 8B is a plan view; FIG. 8C is a bottom view; FIG. 8D is a left side view; and FIG. 8E is a right side view;

FIGS. 9A to 9D are views showing a first slit portion of a housing according to the present invention, in which FIG. 9A is a plan view; FIG. 9B is an F-F line sectional view of FIG. 9A; FIG. 9C is a G-G line sectional view of FIG. 9A; and FIG. 9D is an H-H line sectional view of FIG. 9A;

FIGS. 10A to 10C are views showing a state where the lens shown in FIGS. 8A through 8E is mounted on the first slit portion of the housing shown in FIGS. 9A through 9D, in which FIG. 10A is an explanatory view showing a vertical-section in a direction perpendicular to the light axis of the lens; FIG. 10B is an I-I line sectional view of FIG. 10A; and FIG. 10C is a J-J line sectional view of FIG. 10A;

FIGS. 13A to 13E are views showing a prism as a second embodiment of the optical component according to the present invention, in which FIG. 13A is a front view; FIG. 13B is a plan view; FIG. 13C is a bottom view; FIG. 13D is a left side view; and FIG. 13E is a right side view;

FIGS. 14A to 14D are views showing a second slit portion of a housing according to the present invention, in which FIG. 14A is a plan view; FIG. 14B is a K-K line sectional view of FIG. 14A; FIG. 14C is an L-L line sectional view of FIG. 14A; and FIG. 14D is an M-M line sectional view of FIG. 14A; and FIGS. 15A to 15C are views showing a state where the prism shown in FIGS. 13A through 13E is mounted on the second slit portion of the housing shown in FIGS. 14A through 14D, in which FIG. 15A is an explanatory view showing a vertical-section in a direction perpendicular to the light axis of the prism; FIG. 15B is an N-N line sectional view of FIG. 15A; and FIG. 15C is a P-P line sectional view of FIG. 15A.

DESCRIPTION OF THE PREFERRED EMBODIMENTS

With respect to a slit portion and a rib portion for which a draft angle is required in an optical component retaining device including a combination of an optical component and a housing which are injection-molded using a mold, an aim to provide the optical component retaining device, the optical component thereof and the housing to retain the above is achieved with a comparatively simple structure, in which location adjustment of a pair of rib portions to a predetermined position of the slit portion can be automatically performed at the time of assembly and highly accurate positioning can be performed easily without requiring high accuracy in most parts of those slit portion and rib portion by forming planar surfaces having high accuracy only partly in the slit portion and the rib portion.

Embodiment 1

Figure 1:
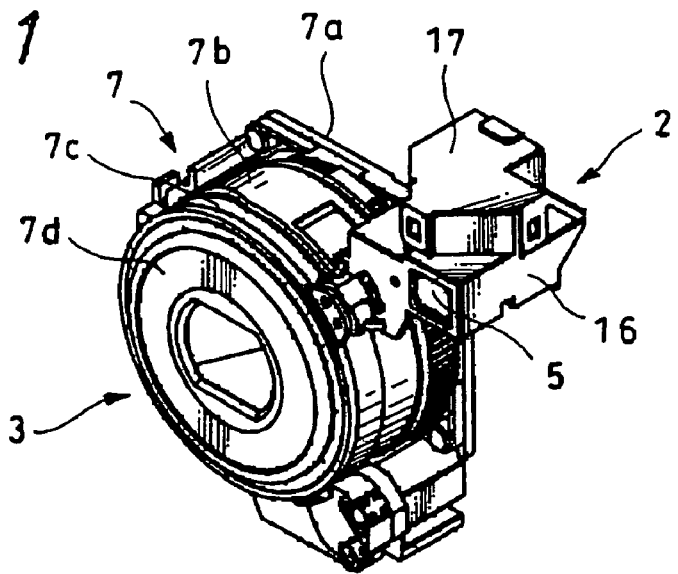
FIG. 1 is a perspective view showing an optical view finder and a lens device to which an optical component retaining device of the present invention is applied.
Figure 2:
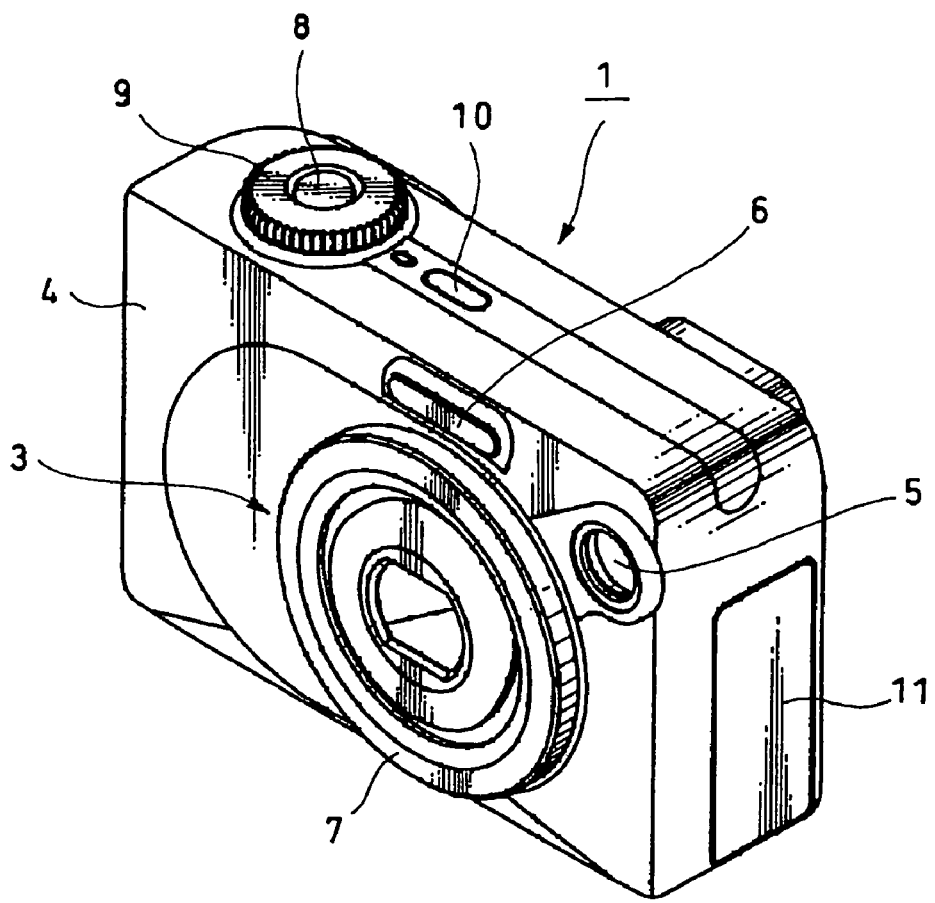
FIG. 2 is an perspective view showing an external appearance of an electronic still camera in which the optical view finder shown in FIG. 1 is incorporated.
Figure 3:
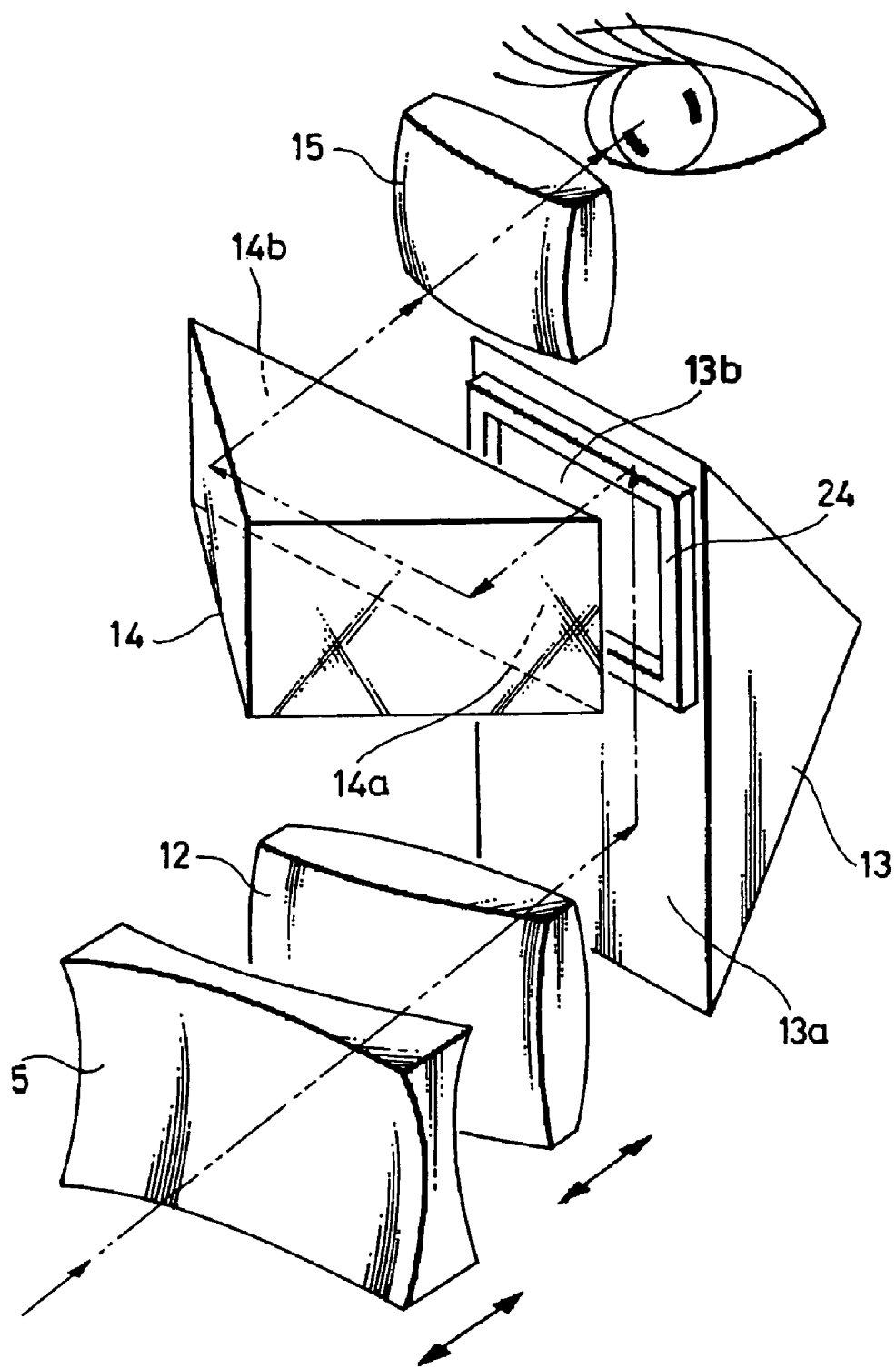
FIG. 3 is an explanatory view showing a composition and disposition of optical components used in the optical view finder shown in FIG. 1.
Figure 4:
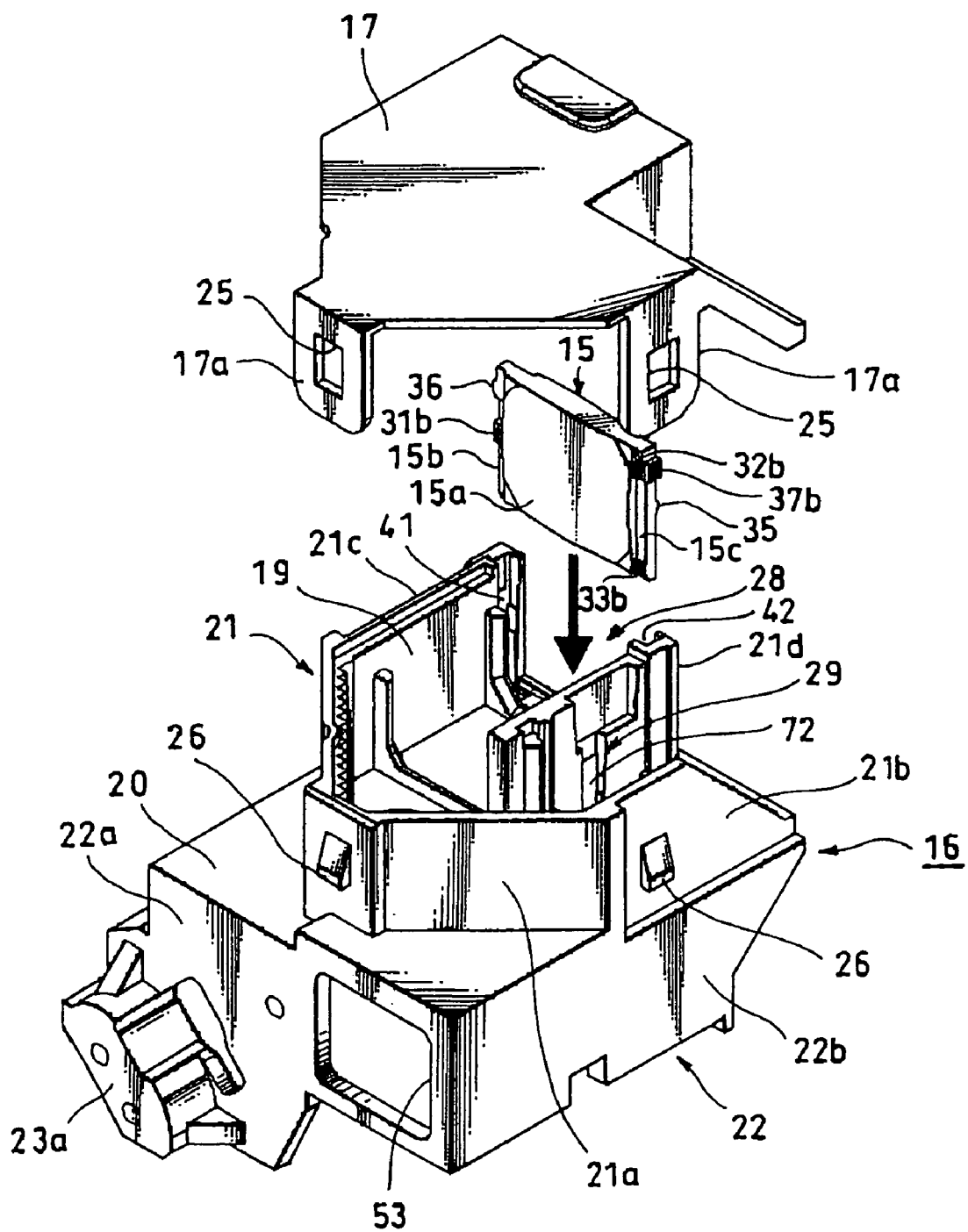
FIG. 4 is a perspective view of an optical view finder according to a first embodiment of the present invention, in which the optical component retaining device of the present invention is used, shown in an exploded manner from the front side.
Figure 5:
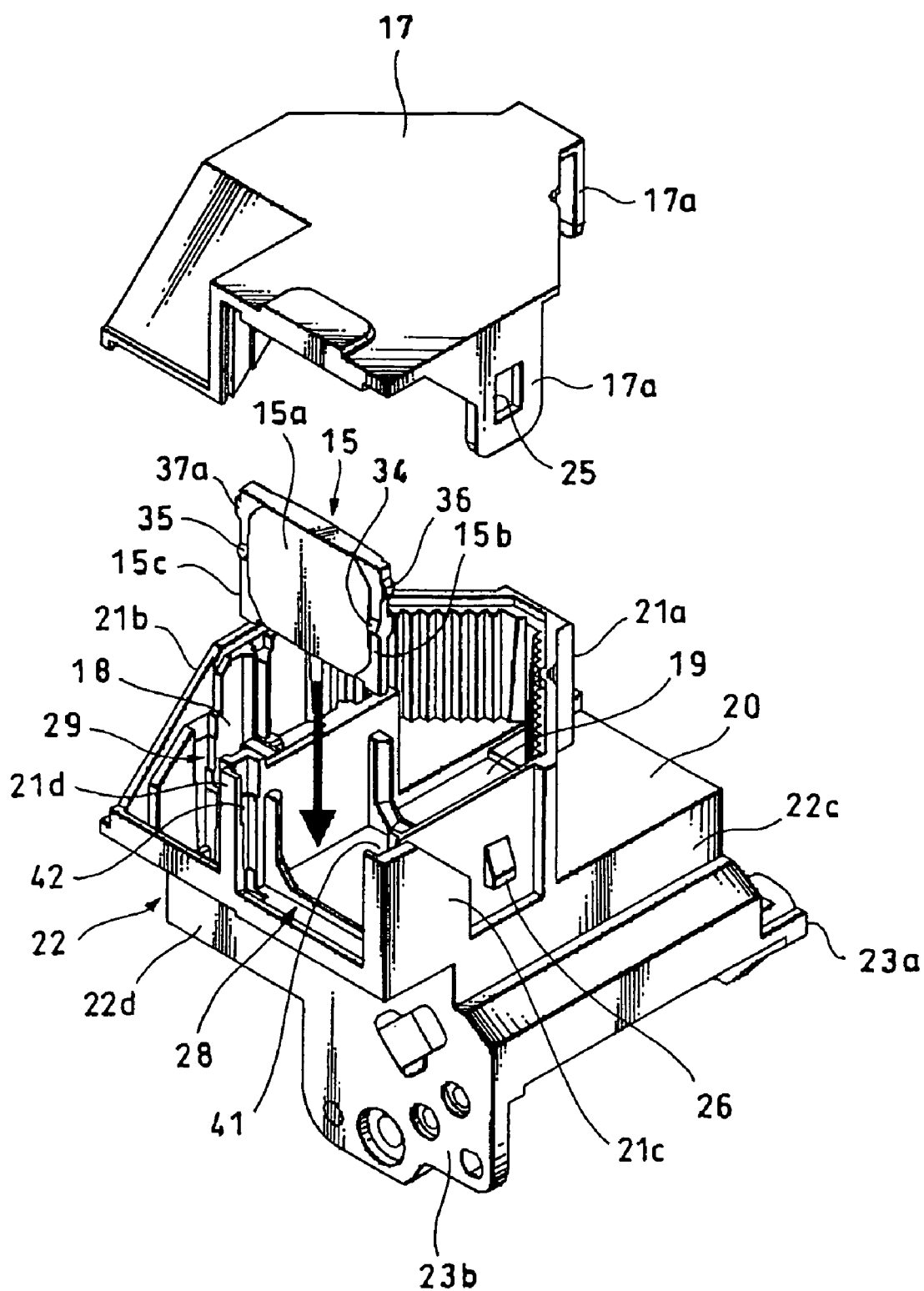
FIG. 5 is a perspective view of the optical view finder according to the first embodiment of the present invention, in which the optical component retaining device of the present invention is used, shown in an exploded manner from the rear side.
Figure 6:
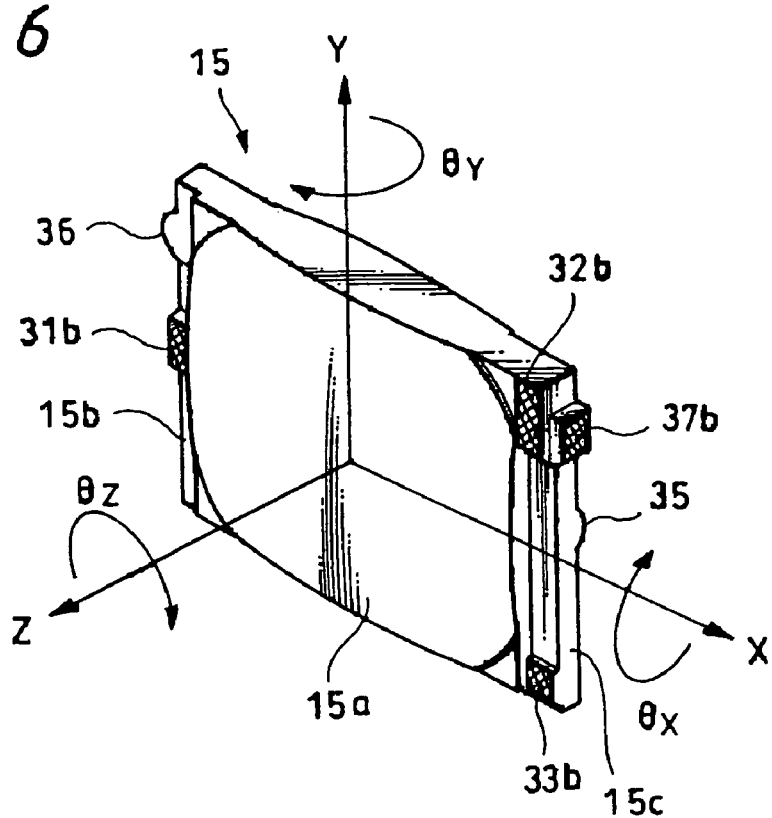
FIG. 6 is a perspective view of a lens as a first embodiment of the optical component according to the present invention, which is shown obliquely downward on three-axis coordinates (X-axis, Y-axis and Z-axis)
Figure 7:
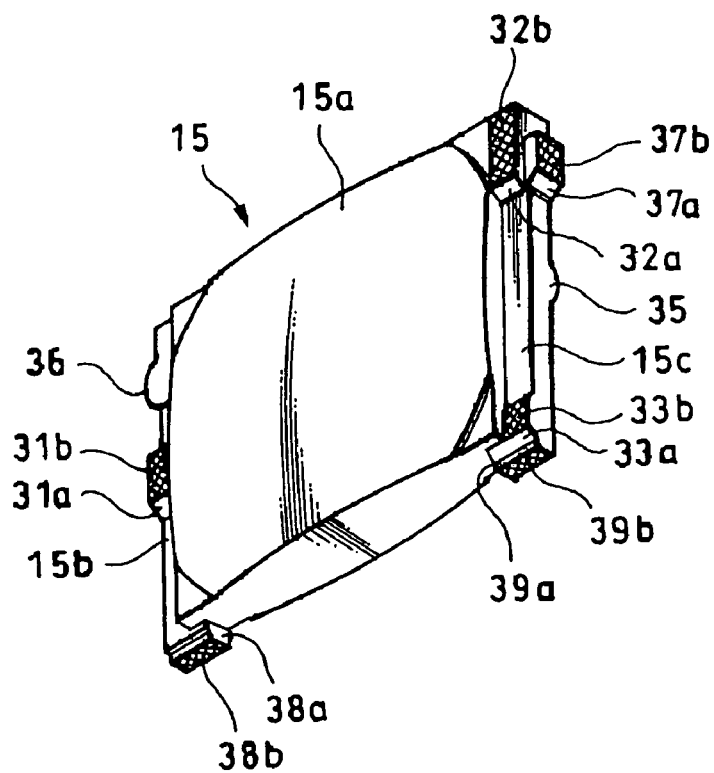
FIG. 7 is a perspective view of a lens as a first embodiment of the optical component according to the present invention, which is shown obliquely upward.

FIGS. 1 through 15 are diagrams showing embodiments of the present invention. Specifically, FIG. 1 is a perspective view showing an optical view finder and a lens device in which the optical component retaining device of the present invention is used; FIG. 2 is a perspective view showing an external appearance of a camera in which the optical view finder of FIG. 1 is incorporated; FIG. 3 is an explanatory view showing constitutional elements of the optical view finder; FIG. 4 is a perspective view showing a first embodiment of the optical component retaining device of the present invention from the front side; FIG. 5 is a perspective view showing the same from the rear side; FIG. 6 is a perspective view showing downward a first embodiment of an optical component according to the present invention; FIG. 7 is a perspective view showing the same upward; FIGS. 8A through 8E are views showing five surfaces of a lens of the first embodiment of the optical component; FIGS. 9A through 9D are explanatory views showing a slit portion of a housing in which the lens shown in FIGS. 8A through 8E is housed; and FIGS. 10A through 10C are explanatory views showing a state in which the lens of FIG. 8 is housed in the slit portion of FIG. 9.

Figure 11:
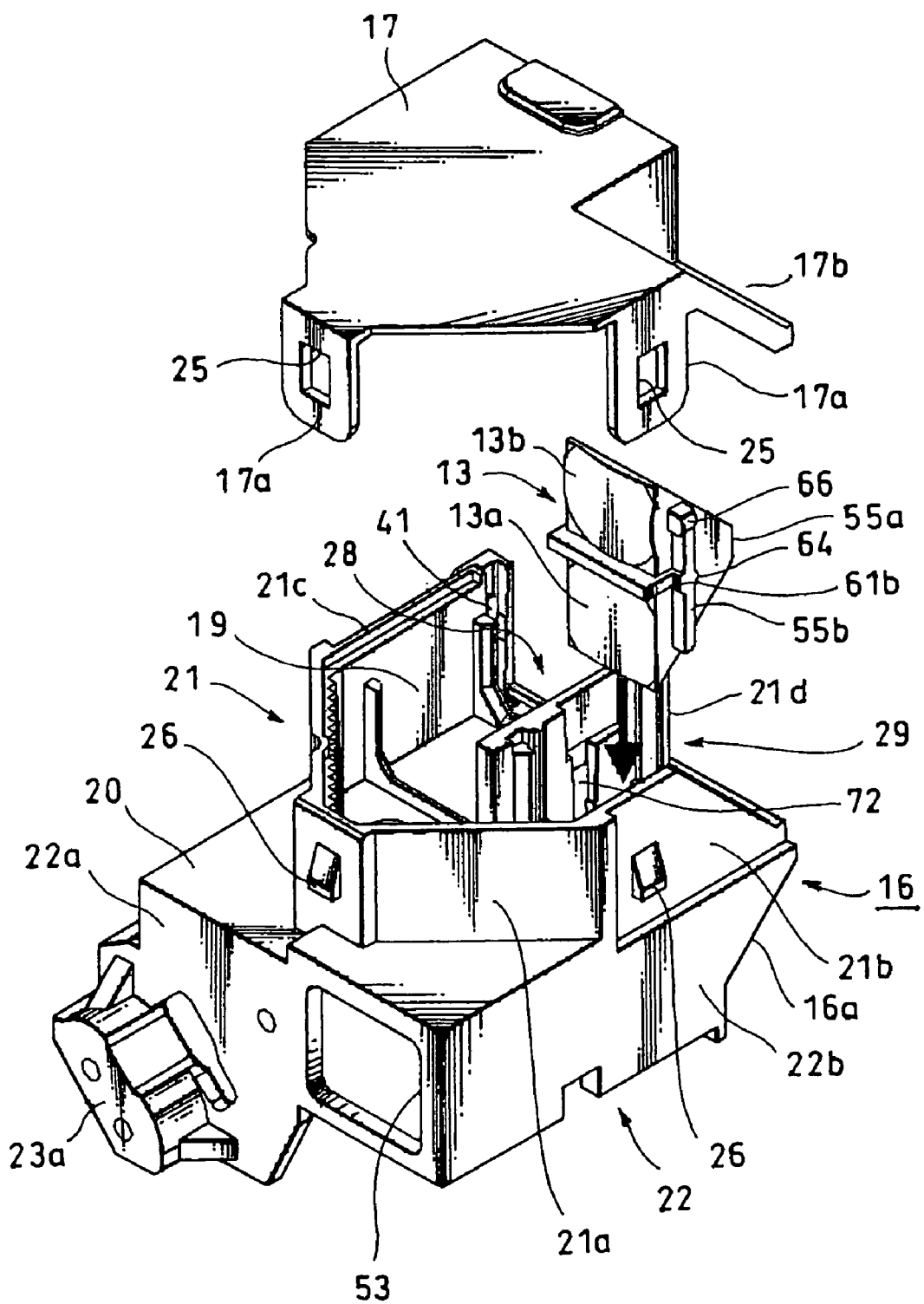
FIG. 11 is a perspective view of an optical view finder according to the second embodiment of the present invention, in which the optical component retaining device of the present invention is used, shown in an exploded manner from the front side.
Figure 12:
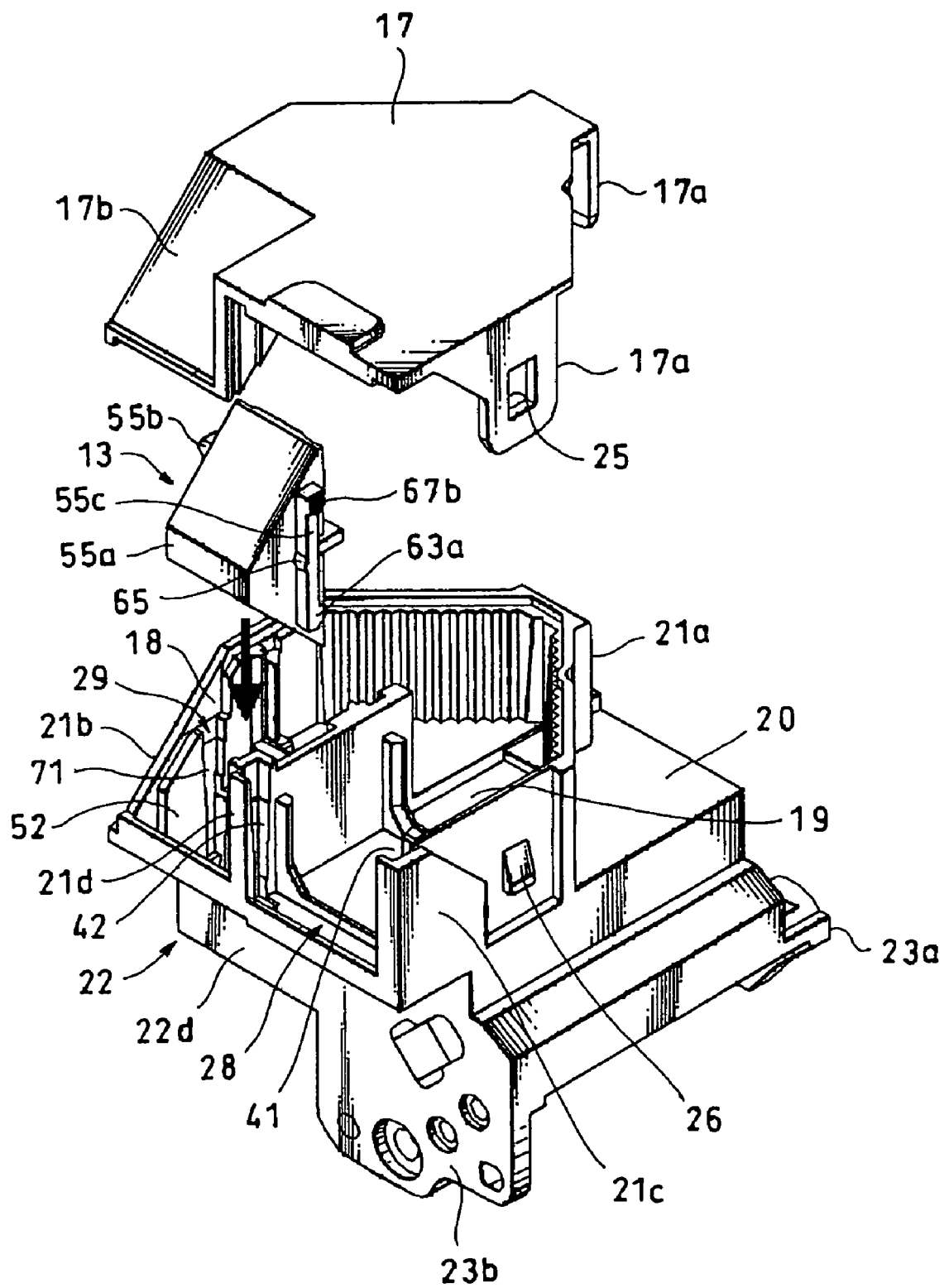
FIG. 12 is a perspective view of the optical view finder according to the second embodiment of the present invention, in which the optical component retaining device of the present invention is used, shown in an exploded manner from the rear side.

Further, FIG. 11 is a perspective view showing a second embodiment of the optical component retaining device of the present invention from the front side; FIG. 12 is a perspective view showing the same from the rear side; FIGS. 13A through 13E are views showing five surfaces of a prism of a second embodiment of an optical component; FIGS. 14A through 14D are explanatory views showing a slit portion of a housing in which the prism of FIGS. 13A through 13E is housed; and FIGS. 15A through 15C are explanatory views showing a state in which the prism shown in FIG. 13 is housed in the slit portion of FIG. 14.

First, referring to FIGS. 1 and 2, an optical view finder having the optical component retaining device of the present invention and a digital still camera that is an embodiment of an image pick-up apparatus including this optical view finder are explained. FIG. 1 is a perspective view showing an optical view finder 2 and a lens device 3 which have the optical component retaining device of the present invention. Further, FIG. 2 is a perspective view showing an external appearance structure of a digital still camera 1 in which the optical view finder 2 and the lens device 3 shown in FIG. 1 are incorporated.

As shown in FIG. 2, the digital still camera 1 has an exterior case 4 made of a casing formed to have an approximately quadrangular shape. On the front surface of the exterior case 4, an objective lens 5 of the optical view finder 2 and a light-emitting portion 6 of a flash device are exposed and also an objective lens side of the lens device 3 is exposed in a manner capable of making forward and backward movement. The lens device 3 is what is called a retractable type lens device in which an objective lens and other lenses are held by a plurality of lens barrels provided as a nested structure, and is disposed in an approximately central portion on the front surface of the exterior case 4. When this digital still camera 1 is seen from the front, the objective lens 5 of the optical view finder 2 is disposed at an obliquely upward position in the lens device 3 and an eyepiece lens thereof is exposed on the rear surface of the exterior case 4. In addition, the light-emitting portion 6 of the flash device is disposed right above the lens device 3.

A shutter button 8, a mode change dial 9 and power switch 10 are disposed at the opposite side to the optical view finder 2 on the top surface of the exterior case 4. The mode change dial 9 is to change a camera function, and as functional modes thereof, there can be mentioned a moving image pick-up mode, a still image pick-up mode, a picture reproduction/edition mode and the like, for example. Also, this dial can be used as a means for selecting a subject, and a scenery mode, a life-size mode, a face size mode and the like, for example, can also be set as other functional modes to be used and switched according to the subject.

The mode change dial 9 having such functions is made into a ring-form, and the shutter button 8 is housed in its hole to be capable of depressing operation. Photographing of a still picture and a moving picture can be performed selectively by the depressing operation of this shutter button 8. In addition, the power switch 10 is provided to supply each portion with the electric power from a built-in battery power source to perform the photographing and the like in various functional modes. As shown in FIG. 2, a case lid 11 to close a housing portion of the battery power source and a housing portion of a recording medium such as a semiconductor recording memory is installed on a side surface of the exterior case 4 in a manner capable of freely opening and closing. Attaching and detaching operation of the battery power source and the recording medium becomes possible by opening this case lid 11 to expose the power source housing portion and the recording medium housing portion.

As shown in FIG. 1, the lens barrel 7 includes a fixed plate 7a which is fixed to the exterior case 4, a fixed lens barrel 7b which is fixed to this fixed plate 7a, two pieces (three or more pieces are also possible) of movable lens barrel 7c and 7d which are held by this fixed lens barrel 7b in a manner capable of moving forward and backward, and the like. The objective lens 5 and the other lenses or optical filters such as an infrared cut filter and an optical low path filter if necessary are held by the movable lens barrels 7c and 7d and the fixed lens barrel 7b.

As shown in FIG. 3, the optical view finder 2 includes the objective lens 5, a zoom adjustment lens 12, a first prism 13, a second prism 14 and an eyepiece lens 15. As shown in FIGS. 4 and 5, and also in FIGS. 11 and 12, those lenses and prisms are housed in a housing 16, and a opening portion arranged on a top surface of this housing 16 is closed by a cover 17 in a manner capable of opening and closing.

In the housing 16, the objective lens 5 and the zoom adjustment lens 12 are constructed in such a manner that respective light axes are brought in line and both the lenses are capable of moving in the light axis direction with the interlocked movement. The first prism 13 is disposed ahead on the light axis of the objective lens 5 and zoom adjustment lens 12. The first prism 13 is of a right-angled prism and a surface opposing to two reflective surfaces which form inclined angles of 45° is made to be an incident surface 13a and an exit surface 13b. These incident surface 13a and exit surface 13b are disposed in the vertical direction having the incident surface 13a on the lower side, and a view frame 24 to set an outer edge of a viewing range is arranged at a periphery of the exit surface 13b positioned on the upper side.

An incident surface 14a of the second prism 14 is opposed to the exit surface 13b of the first prism 13. The second prism 14 is also made of the right-angled prism, and a surface opposing two reflective surfaces which make inclined angles of 45° is made to be the incident surface 14a and an exit surface 14b. These incident surface 14a and exit surface 14b are disposed horizontally, and the eyepiece lens 15 in which the light axis is similarly brought in line is disposed ahead on the light axis of the exit surface 14b. A user's eye is to be disposed ahead on the light axis of this eyepiece lens 15.

The housing 16 includes a planar surface portion 20 formed to have an approximately quadrangular shape, an upper enclosure wall portion 21 arranged on a top surface of this planar surface portion 20 and a lower enclosure wall portion 22 arranged on a lower surface of the planar surface portion 20. The upper enclosure wall portion 21 arranged on the top surface of the planar surface portion 20 has a pentagonal shape and includes an upper front wall 21a which is angled at approximately 90°, right and left upper lateral walls 21b and 21c which are extended backward continuously from both ends of this upper front wall 21a, and a partition wall 21d which is arranged in parallel between both upper lateral walls 21b and 21c. A top surface and a rear surface of the upper enclosure wall portion 21 are set open and the cover 17 is attached to this upper enclosure wall portion 21 in a detachable manner.

The cover 17 has a planar shape corresponding to the shape of the top surface of the upper enclosure wall portion 21 and is made into a shape capable of closing an opening portion of this top surface and one side of an opening portion opened in the rear surface. A fixing piece 17a having elasticity to be attached to the upper enclosure wall 21 is arranged at three locations of this cover 17. An engagement hole 25 having a quadrangular shape is arranged in each fixing piece 17a, respectively. Further, engagement nails 26 of projection-form to be detachable to the engagement holes 25 are arranged respectively on the upper front wall 21a and the upper lateral walls 21b and 21c of the upper enclosure wall portion 21 at three locations corresponding to these engagement holes 25.

The second prism 14 described above is housed inside the upper front wall 21a of the upper enclosure wall portion 21 in a state where the incident surface 14a and the exit surface 14b face backward. Thus, the back of the second prism 14 is divided into the left and the right by the partition wall 21d, and an incident side light path 18 opposing to the incident surface 14a and an exit side light path 19 opposing to the exit surface 14b are set. The eyepiece lens 15 according to a first embodiment of the present invention, which is described later on, is arranged in this exit side light path 19, and also the first prism 13 according to a second embodiment of the present invention, which is described later on, is arranged in the incident side light path 18. Each of these eyepiece lens 15 and first prism 13 is held and fixed individually in the housing 16 by inserting a pair of rib portions 15b and 15c, and 13a and 13b respectively in slit portions 28 and 29 of the housing 16 and by holding the pair of rib portions 15b and 15c, and 13a and 13b respectively in each of the slit portions 28 and 29.

As shown in FIGS. 6 and 7, the eyepiece lens 15 includes a lens main body 15a which is made of a convex lens and a pair of rib portions 15b and 15c arranged on both sides thereof in the right and left direction (explained as an X-axis in this embodiment) which is a direction orthogonal to a light axis of this lens main body 15a (in this embodiment, the light axis is assumed as a Z-axis and two axes orthogonal to this axis and orthogonal to each other are explained as an X-axis and a Y-axis). Respective thicknesses (length in a Z-axis direction) of the pair of rib portions 15b and 15c of the eyepiece lens 15 are set smaller (thinner) than the thinnest portion of the lens main body 15a, and these rib portions are respectively extended from the upper end to the lower end of the lens main body 15a.

Figure 8B:
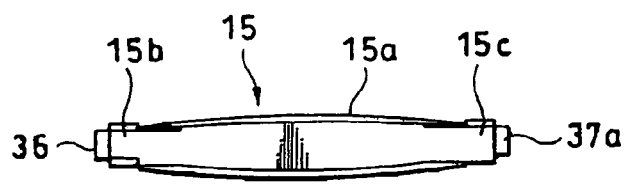
Figure 8D:
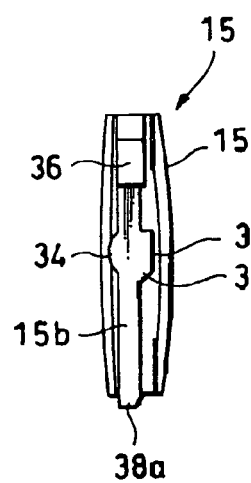
Figure 8A:
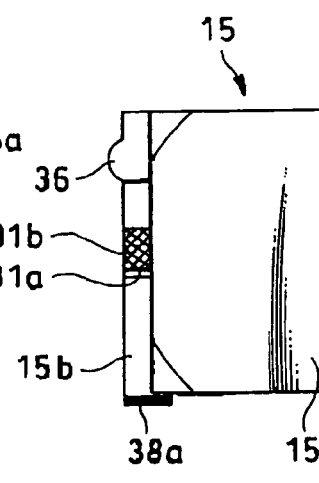
Figure 8E:
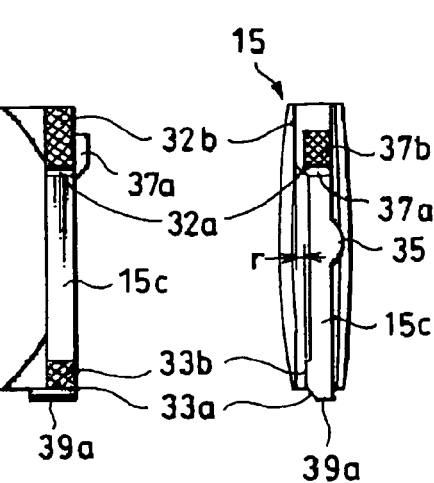
Figure 8C:
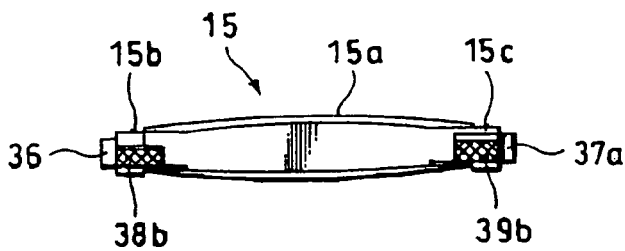

FIGS. 8A through 8E show the eyepiece lens 15, wherein FIG. 8A is a front view, FIG. 8B is a plan view, FIG. 8C is a bottom plan view, FIG. 8D is a left side view, and FIG. 8E is a right side view. A first convex portion 31a is arranged in the middle portion in the vertical direction on one side surface of the first rib portion 15b which is one rib portion located on the left side in FIG. 8A in the pair of rib portions 15b and 15c of the eyepiece lens 15, and a first planar surface 31b made of a planar surface extended in a vertical direction to the Z-axis is formed on a front surface of this first convex portion 31a. Further, a second convex portion 32a and a third convex portion 33a are arranged at both end portions in the vertical direction on one side surface of the second rib portion 15c which is the rib portion on the other side. A second planar surface 32b and a third planar surface 33b made of planar surfaces extended in the vertical direction to the Z-axis are formed respectively on front surfaces of the second convex portion 32a and the third convex portion 33a.

The third planar surface 33b is set on an inner side compared to the second planar surface 32b and is set such that a length (distance) from the center of the second rib portion 15c to the second planar surface 32b becomes longer than a length (distance) from the center of the second rib portion 15c to the third planar surface 33b. Accordingly, a level difference r for setting a predetermined interval in the Z-axis direction is arranged between the second planar surface 32b and the third planar surface 33b.

Thus, three planar surfaces of the first planar surface 31b, the second planar surface 32b and the third planar surface 33b are disposed in a form of a triangle with the lens main body 15a in between and also are made into mutually parallel planar surfaces among one another. The first to third planar surfaces of 31b through 33b constitute reference surfaces of three locations of the eyepiece lens 15 showing a first embodiment of the optical component, which are made parallel with the insertion direction to the first slit portion 28.

Further, a fourth convex portion 34 is arranged in an approximately middle portion in the vertical direction on the other side surface of the first rib portion 15b in the pair of rib portions 15b and 15c, and a fifth convex portion 35 is arranged in an approximately middle portion in the vertical direction on the other side surface of the second rib portion 15c. These fourth and fifth convex portions 34 and 35 are set at positions of approximately the same height and are formed respectively of convex portions having semi-cylindrical shape with curved surfaces.

Moreover, a sixth convex portion 36 projecting to a lateral direction (opposite direction to X-axis direction) is arranged in an upper part of the first rib portion 15b. Similarly to the fourth convex portion 34, the sixth convex portion 36 is formed as a convex portion of a semi-cylindrical shape whose surface shape is made into a curved surface. A square-shaped eighth convex portion 38a projecting downward is arranged in a lower part of this first rib portion 15b. A first bottom planar surface 38b which is a planar surface extended in the vertical direction to the Y-axis is formed on the lower surface of this eighth convex portion 38a.

Also, a seventh convex portion 37a projecting in a lateral direction (X-axis direction) is arranged in an upper part of the second rib portion 15c. A lateral planar surface 37b which is a planar surface extended in the vertical direction to the X-axis is formed on a lateral surface of this seventh convex portion 37a. A square-shaped ninth convex portion 39a projecting downward is arranged in a lower part of this rib portion 15c on the other side. A second bottom planar surface 39b which is a planar surface extended in the vertical direction to the Y-axis is formed on the lower surface of this ninth convex portion 39a.

The first slit portion 28 of the housing 16 in which the eyepiece lens 15 having the above structure is inserted has such a structure as shown in FIGS. 4, 5, 9 and 10. The first slit portion 28 is set at the exit portion of the exit side light path 19 of the second prism 14 which is enclosed with the planar surface portion 20, the upper enclosure wall portion 21 and the cover 17 of the housing 16. This first slit portion 28 is formed of a first longitudinal guide groove 41 of V-groove shape which is arranged on an inner surface of the rear portion of the upper lateral wall 21c and a second longitudinal guide groove 42 of V-groove shape which is arranged on an inner surface of the rear portion of the partition wall 21d. Further, a first bottom reception surface 43a and a second bottom reception surface 43b which extend between the first and second longitudinal guide grooves 41 and 42 are arranged in the planar surface portion 20.

As shown in FIGS. 4 and 5, the first rib portion 15b of the eyepiece lens 15 is inserted into the first longitudinal guide groove 41 of the first slit portion 28, and the second rib portion 15c of the eyepiece lens 15 is inserted into the second longitudinal guide groove 42. When this eyepiece lens 15 is inserted and guided by both the longitudinal guide grooves 41 and 42 to reach a predetermined position, a lower surface which is an end of an insertion side of the eyepiece lens 15 comes into contact with an top surface of the planar surface portion 20. After that, an inner surface of the cover 17 comes into contact with an top surface of the eyepiece lens 15 by mounting the cover 17 on the housing 16. Accordingly, the lens main body 15a forming the quadrangle is made to fit in an open window forming the quadrangle as well, and the eyepiece lens 15 is installed fixedly in the housing 16 through the first slit portion 28.

Figure 9A:
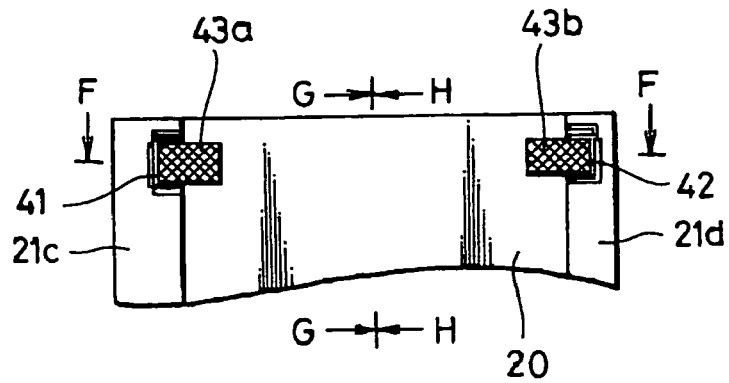
Figure 9B:
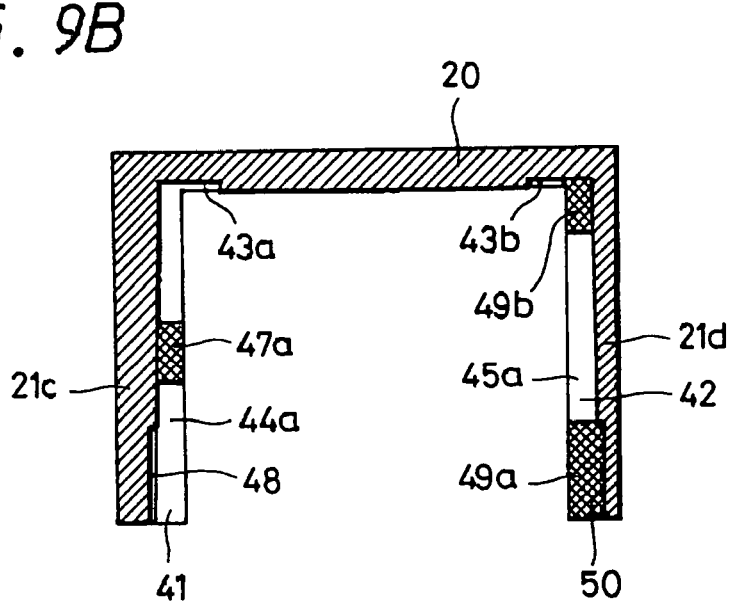
Figure 9C:
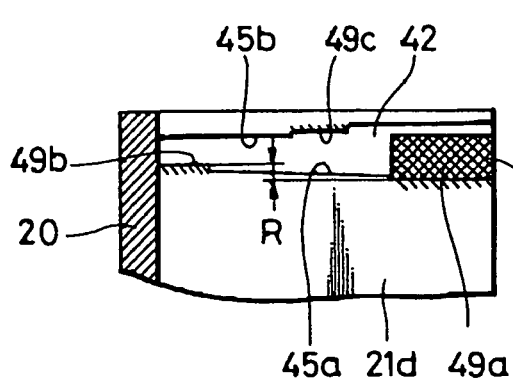
Figure 9D:
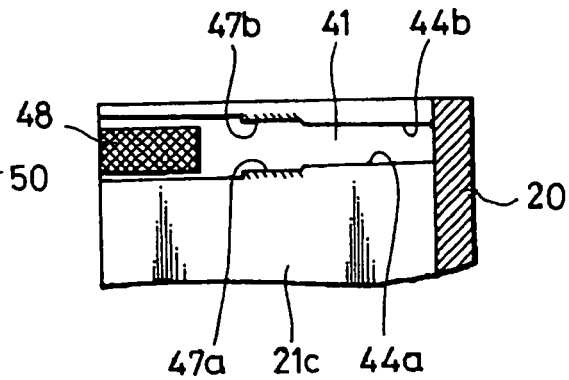
Figure 10A:
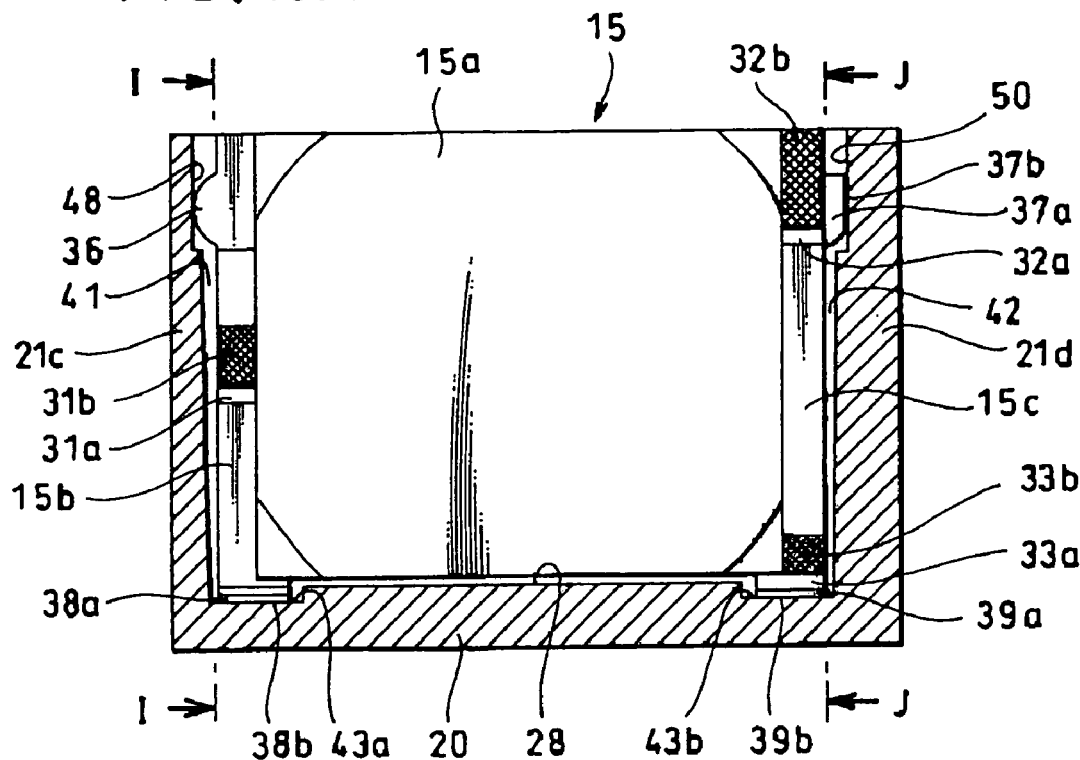
Figure 10B:
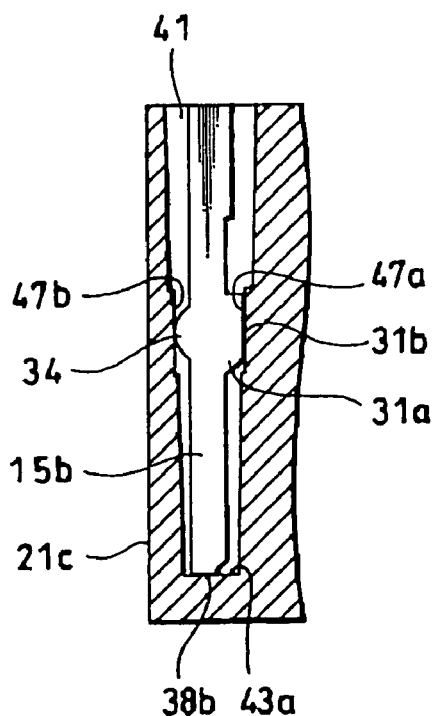
Figure 10C:
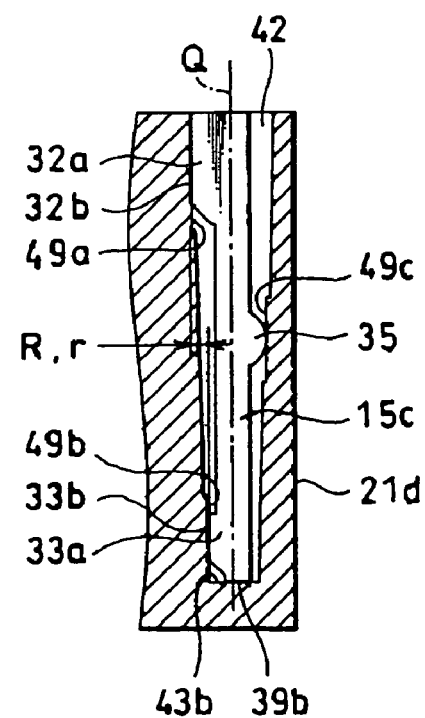

FIG. 9A is a plan view showing the first slit portion 28 arranged in the housing 16 from the upper side; FIG. 9B is an F-F line sectional view of FIG. 9A; FIG. 9C is a G-G line sectional view of FIG. 9A; and FIG. 9D is an H-H line sectional view of FIG. 9A. Further, FIG. 10A is a front view showing a state where the eyepiece lens 15 is mounted in the first slit portion 28; FIG. 10B is an I-I line sectional view of FIG. 10A; and FIG. 10C is a J-J line view of FIG. 10A.

As shown in FIGS. 9A through 9D and FIGS. 10A through 10C, the first and second longitudinal guide grooves 41 and 42 of the first slit portion 28 are formed to have as a basic shape a concave portion of a V-groove shape where a draft angle of suitable size is arranged on both surfaces of each groove. Further, planar surface portions of a certain size (area) are formed at suitable locations of respective inclined surfaces of 44a, 44b and 45a, 45b of the first and second longitudinal guide grooves 41 and 42.

In this first embodiment, the planar surface portions made to correspond to the shape of the above described eyepiece lens 15 are arranged at three locations on the inclined surfaces of 44a and 45a on one side of the first and second longitudinal guide grooves 41 and 42 which oppose one side surface of the eyepiece lens 15, constituting the first supporting surfaces. The reference surfaces of three locations of the eyepiece lens 15 (from the first planar surface 31b to the third planar surface 33b) come into surface contact with the first supporting surfaces of these three locations. Also, the planar surface portions are arranged at two locations on the inclined surfaces 44b and 45b on the other side of the first and second longitudinal guide grooves 41 and 42 which oppose the other side surface of the eyepiece lens 15, constituting the second supporting surfaces. The convex portions of two locations of the eyepiece lens 15 (the fourth convex portion 34 and the fifth convex portion 35) come into approximately linear contact with the second supporting surfaces of these two locations.

Next, the shape and structure of the first slit portion 28 is explained in detail. The first longitudinal guide groove 41 of the first slit portion 28 is shown in FIGS. 9A, 9B and 9D, and a first reception surface 47a is arranged in an approximately middle portion in the direction of depth (Y-axis direction and counter Y-axis direction of the eyepiece lens 15) on the first inclined surface 44a located on the side close to the second prism 14 (in a Z-axis direction of the eyepiece lens 15). As shown in FIG. 10B, the first planar surface 31b of the eyepiece lens 15 comes into contact with this first reception surface 47a. The first reception surface 47a is set to be a somewhat bigger planar surface than the first planar surface 31b and also is formed in parallel with the direction of depth.

In addition, a fourth convex portion reception surface 47b is arranged similarly in an approximately middle portion in the direction of depth on the second inclined surface 44b, of the first longitudinal guide groove 41, which is located on the side opposite to the second prism 14 (counter Z-axis direction of the eyepiece lens 15). As shown in FIG. 10B, the fourth convex portion 34 of the eyepiece lens 15 comes into contact with this fourth convex portion reception surface 47b. The fourth convex portion reception surface 47b is made into a planar surface of approximately the same size as the first reception surface 47a, and both reception surfaces 47a and 47b are formed in parallel with each other.

As shown in FIG. 10A, furthermore, a sixth convex portion reception surface 48, with which the sixth convex portion 36 of the eyepiece lens 15 comes into contact, is arranged on a lateral surface intersecting at approximately right angles to the first inclined surface 44a and second inclined surface 44b of the first longitudinal guide groove 41. Similarly to the first reception surface 47a and the like, this sixth convex portion reception surface 48 is also formed in parallel with the direction of depth.

Also, the second longitudinal guide groove 42 of the first slit portion 28 is shown in FIGS. 9A, 9B and 9C, and a second reception surface 49a is arranged on the opening side in the direction of depth on the first inclined surface 45a located on the side close to the second prism 14, and a third reception surface 49b is arranged on the bottom surface side. As shown in FIG. 10C, the length (distance) from a center line Q of the second longitudinal guide groove 42, which also becomes a center line of the second rib portion 15c, to the second reception surface 49a is set longer than the length from this center line Q to the third reception surface 49b. Accordingly, a level difference R having a predetermined length (distance) is set between the second reception surface 49a and the third reception surface 49b as shown in FIGS. 9C and 10C. This level difference R is the same as the level difference r between the second planar surface 32b and third planar surface 33b of the eyepiece lens 15.

The second planar surface 32b of the eyepiece lens 15 comes into contact with the second reception surface 49a of the second longitudinal guide groove 42, and the third planar surface 33b of the eyepiece lens 15 comes into contact with the third reception surface 49b. The second reception surface 49a is set to be somewhat a larger planar surface than the second planar surface 32b, and similarly the third reception surface 49b is set to be somewhat a larger planar surface than the third planar surface 33b. Further, the second reception surface 49a and the third reception surface 49b are respectively formed in parallel in the direction of depth.

Further, a fifth convex portion reception surface 49c is arranged in an approximately middle portion in the direction of depth on the second inclined surface 45b, which is located on the side opposite to the second prism 14, of the second longitudinal guide groove 42. The fifth convex portion 35 of the eyepiece lens 15 comes into contact with this fifth convex portion reception surface 49c. The fifth convex portion reception surface 49c is made into a planar surface of approximately the same size as the fourth convex portion reception surface 47b and is formed mutually in parallel with the second reception surface 49a and the third reception surface 49b. Furthermore, a lateral reception surface 50, with which the seventh convex portion 37a of the eyepiece lens 15 comes into contact, is arranged on a lateral surface intersecting at approximately right angles to the first inclined surface 45a and second inclined surface 45b of the second longitudinal guide groove 42 as shown in FIG. 10A. Though extending in the direction intersecting at right angles to the second reception surface 49a and the like, this lateral reception surface 50 is formed similarly in parallel with the direction of depth.

The eyepiece lens 15, the housing 16 and the cover 17, which have the above described structure, can be manufactured with high accuracy and yet comparatively with ease by injection molding using a moldable material such as synthetic resin, for example. For example, methacrylic resin (PMMA) "Brand name: ACRYPET (product of Mitsubishi Rayon Co., LTD)" can be mentioned as the material of the eyepiece lens 15, the first prism 13 and the second prism 14. However, the material is not limited thereto but it is obvious that other synthetic resin than that can be applied as well. In addition, although glass-fiber reinforced polycarbonate, for example, is suitable as the material of the housing 16 and the cover 17, the material is not limited thereto but it is obvious that other synthetic resin than that can be used, and furthermore it is also possible to use a metal such as aluminum alloy or stainless steel.

The optical component retaining device including the above described eyepiece lens 15 and first slit portion 28 is, for example, used as follows. The eyepiece lens 15 is installed by inserting the pair of rib portions 15b and 15c arranged on both sides in the lateral direction of the lens main body 15a into the pair of longitudinal guide grooves 41 and 42 of the first slit portion 28 arranged in the housing 16 and by holding the pair of rib portions 15b and 15c by means of the first slit portion 28. Further, the cover 17 is mounted on the housing 16, and the eyepiece lens 15 is positioned and fixed at a predetermined position in the housing 16 by depressing an upper part of the eyepiece lens 15 with this cover 17.

In this case, if the eyepiece lens 15 and the housing 16 are formed by the injection molding, a draft angle is necessary on a cavity side surface of a mold due to mold structure, because the length (distance) in the direction of depth (Y-axis direction and counter Y-axis direction) of the first and second longitudinal guide grooves 41 and 42 in the first slit portion 28 arranged in the housing 16 is long. When the eyepiece lens and the housing which are manufactured using the mold having this draft angle are assembled, conventionally it is necessary to set the accuracy of the draft angle of the slit portion high over the whole surface in order to raise the assembly accuracy; however there is a great difficulty accompanied to do so. On the other hand, it is structurally possible in the mold to make the accuracy of the draft angle of the slit portion irrelevant to location adjustment and to partly eliminate the draft angle to make into a planar surface. Further, even if a plurality of planar surface portions formed as described above are arranged in several locations, it is comparatively easy to set positions of those planar surface portions with high accuracy.

The present invention is made in light of such a viewpoint and has such characteristics that planar surfaces are arranged at a plurality of locations of draft angles in a slit portion and in a pair of rib portions; and these plurality of planar surfaces are used as reference surfaces to perform positioning of an eyepiece lens with respect to a housing easily and accurately.

In this embodiment, the first reception surface 47a, the second reception surface 49a and the third reception surface 49b, and also the fourth convex portion reception surface 47b, the fifth convex portion reception surface 49c, the sixth convex portion reception surface 48 and lateral reception surface 50 are arranged in the first slit portion 28 of the housing 16, and planar surfaces of suitable size "without draft angle" and in parallel with the insertion direction (counter Y-axis direction) of the eyepiece lens 15 are formed at a plurality of locations in these reception surfaces. In this time, the draft angle is necessary between the second reception surface 49a and the third reception surface 49b. Therefore, the level difference R is provided between both the reception surfaces 49a and 49b to take out a molded product by means of this level difference R. Further, the first and second bottom reception surfaces 43a and 43b which continue to the first and second longitudinal guide grooves 41 and 42 are arranged in the bottom of the first slit portion 28 (lower surface in the direction of depth).

Such planar surfaces and convex portions, which come into contact with respective reception surfaces of the first slit portion 28, are provided in the pair of rib portions 15b and 15c of the eyepiece lens 15 showing the first embodiment of the optical component as heretofore described. Specifically, convex portions are arranged at nine locations from the first convex portion 31a to the ninth convex portion 39a in the pair of rib portions 15b and 15c, and the planar surfaces at three locations from the first planar surface 31b to the third planar surface 33b are arranged correspondingly on the external surfaces of the convex portions of three locations from the first convex portion 31a to the third convex portion 33a among these nine convex portions. Further, the lateral planar surface 37b is arranged on the external surface of the seventh convex portion 37a, and the first bottom planar surface 38b and the second bottom planar surface 39b are arranged on the external surfaces of the eighth convex portion 38a and the ninth convex portion 39a.

Furthermore, the level difference r of the same size corresponding to the level difference R of the first slit portion 28 (refer to FIG. 8E) is arranged between the second planar surface 32b and the third planar surface 33b in the rib portion 15c. This level difference r is formed by making the distance (length) from the center of the second rib portion 15c to the second planar surface 32b shorter than the distance (length) from the center of the second rib portion 15c to the third planar surface 33b.

Thus, the first planar surface 31b of the first rib portion 15b comes into contact with the first reception surface 47a of the first slit portion 28; the second planar surface 32b of the second rib portion 15c comes into contact with the second reception surface 49a; and the third planar surface 33b comes into contact with the third reception surface 49b. The fourth convex portion 34 of the first rib portion 15b comes into contact with the fourth convex portion reception surface 47b of the first slit portion 28; the fifth convex portion 35 of the second rib portion 15c comes into contact with the fifth convex portion reception surface 49c. Furthermore, the sixth convex portion 36 of the first rib portion 15b comes into contact with the sixth convex portion reception surface 48 of the first slit portion 28; and the lateral planar surface 37b of the second rib portion 15c comes into contact with the lateral reception surface 50. Further, the first bottom planar surface 38b of the first rib portion 15b comes into contact with the first bottom reception surface 43a of the first slit portion 28; and the second bottom planar surface 39b of the second rib portion 15c comes into contact with the second bottom reception surface 43b.

The above described first planar surface 31b, second planar surface 32b, third planar surface 33b, lateral planar surface 37b, first bottom planar surface 38b and second bottom planar surface 39b are the ones which become the reference surfaces to fit the eyepiece lens 15 into each reception surface of the first slit portion 28. In addition, each circular-arc convex portion of the fourth convex portion 34, fifth convex portion 35 and sixth convex portion 36 is arranged to absorb rattling of the eyepiece lens 15 by light press-fitting or the like at the time of assembly.

The first reception surface 47a, second reception surface 49a and third reception surface 49b in this first slit portion 28 come in contact with each surface from the first planar surface 31b to the third planar surface 33b, which are the reference surfaces, to constitute the first supporting surface for retaining those planar surfaces. Further, the fourth convex portion reception surface 47b and the fifth convex portion reception surface 49c in the first slit portion 28 come in contact with the fourth convex portion 34 and the fifth convex portion 35 to constitute the second supporting surface for retaining those convex portions Next, an explanation is made with respect to the mold for injection molding to manufacture the eyepiece lens 15 and the housing 16 which have the above described structure and the first prism 13 which is described later on. The reason why the explanation is made hereupon with respect to the mold is because the eyepiece lens 15, the housing 16 and the first prism 13 are ones manufactured by the injection molding. Specifically, if a cavity (space portion) of the mold for molding an outer shape of the eyepiece lens 15 and the housing 16 which are molded parts (as well as the first prism 13) can be formed with accuracy, the molding accuracy is directly reflected in and obtained as the accuracy of the molded part.

The present invention has such characteristics that the cavity of the mold, particularly positional accuracy of the reference surface and the first and second supporting surfaces, is formed with high accuracy, whereby the eyepiece lens 15 having the reference surface of that high accuracy and the housing 16 having the first supporting surface and second supporting surface of the high accuracy are directly obtained by the injection molding to make the assembly work easy with the high positional accuracy. In this case, since the reference surfaces and the first and second supporting surfaces arranged in the cavities of the mold are comparatively small planar surfaces arranged at part of the draft angles which are formed in the rib portion and in the slit portion, the accuracy thereof can be easily set high.

With respect to the eyepiece lens 15, in the cavity of the mold for the eyepiece lens to be injection-molded, the position of each planar surface corresponding respectively to the first planar surface 31b, the second planar surface 32b, the third planar surface 33b and the lateral planar surface 50 which are arranged in the pair of rib portions 15b and 15c of the eyepiece lens 15 is suitably adjusted to be set to a predetermined position with high accuracy, respectively. Specifically, each corresponding planar surface in the cavity corresponding to each planar surface of the pair of rib portions 15b and 15c is adjusted by performing finishing work in the direction of X-axis, Y-axis or Z-axis on the coordinate axes consisting of X-axis, Y-axis and Z-axis shown in FIG. 6 to obtain the high positional accuracy in those axis directions and high inclination accuracy in rotational directions centering on X-axis, Y-axis and Z-axis.

After the corresponding planar surfaces are thus corrected respectively to finish into predetermined dimensions, corresponding concave surfaces made of circular-arc shape concave surfaces of the cavity, which correspond to the fourth convex portion 34, the fifth convex portion 35 and the sixth convex portion 36 in the pair of rib portions 15b and 15c, are adjusted by performing finishing work on the above described coordinates axes to obtain predetermined high positional accuracy and inclination accuracy. Since the above described planar surfaces and convex portions in the cavity of the mold thus adjusted for the eyepiece lens are comparatively small area portions formed partly in each rib portion of 15b and 15c, adjustment work to set the positional accuracy and inclination accuracy thereof high can be performed with ease comparatively.

Also, with respect to the housing 16, in the cavity of the mold for injection-molding this housing, similarly the position of each planar surface corresponding respectively to the first reception surface 47a, the second reception surface 49a, the third reception surface 49b, the fourth convex portion reception surface 47b, the fifth convex portion reception surface 49c, the sixth convex portion reception surface 48 and the lateral reception surface 50 which are arranged in the first slit portion 28 of V-groove shape is suitably corrected respectively so as to be set into predetermined high positional accuracy. Specifically, each corresponding planar surface in the cavity corresponding to each planar surface of the first slit portion 28 is adjusted by performing finishing work in the direction of X-axis, Y-axis or Z-axis on the coordinates axes consisting of X-axis, Y-axis and Z-axis to obtain the high positional accuracy in those axis directions and the high inclination accuracy in the rotational directions centering on X-axis, Y-axis and Z-axis.

Since the above described planar surfaces in the cavity of the mold thus adjusted for the housing are comparatively small area portions formed partly in the first slit portion 28, the adjustment work to set the positional accuracy and inclination accuracy thereof high can be performed with ease comparatively as well. Relations between an adjustment method and a correction surface in each cavity of such mold for the eyepiece lens and mold for the housing are shown in table 1.

TABLE 1

| Direction | Correction surface and adjusting contents of rib portions 15B, 15C (55B, 55C) | Correction surface and adjusting contents of slit portion 28 (29) |
|---|---|---|
| X-axis | Position of lateral planar surface (37b) | Position of lateral reception surface (50) |
| Y-axis | Position of first bottom planar surface (38b) Position of second bottom planar surface (39b) | Position of first bottom reception surface (43a) Position of second bottom reception surface (43b) |
| Z-axis | Position of first planar surface (31b) Position of second planar surface (32b) Position of third planar surface (33b) | Position of first reception surface (47a) Position of second reception surface (49a) Position of third reception surface (49b) |
| θx: rotation on X-axis | Level difference between second planar surface (32b) and third planar surface (33b) | Level difference between second reception surface (49a) and third reception surface (49b) |
| θy: rotation on Y-axis | Level difference between first planar surface (31b) and second planar surface (32b) Level difference between first planar surface (31b) and third planar surface (33b) | Level difference between first reception surface (47a) and second reception surface (49a) Level difference between first reception surface (47a) and third reception surface (49b) |
| θz: rotation on Z-axis | Level difference between first bottom planar surface (38b) and second bottom planar surface (39b) | Level difference between first bottom reception surface (43a) and second bottom reception surface (43b) |

As is clear from the table 1, in the X-axis direction, the position of the lateral planar surface 37b can be corrected and adjusted with respect to the pair of rib portions 15b and 15c, and also the position of the lateral reception surface 50 can be corrected and adjusted with respect to the first slit portion 28. In the Y-axis direction, the positions of the first bottom planar surface 38b and the second bottom planar surface 39b can be corrected and adjusted in the pair of rib portions 15b and 15c, and also the positions of the first bottom reception surface 43a and the second bottom reception surface 43b can be corrected and adjusted in the first slit portion 28. Furthermore, in the Z-axis direction, the positions of the first planar surface 31b, the second planar surface 32b and the third planar surface 33b can be corrected and adjusted in the rib portions 15b and 15c, and also the positions of the first reception surface 47a, the second reception surface 49a and the third reception surface 49b can be corrected and adjusted in the first slit portion 28.

Further, in the rotational direction θx on the X-axis, the level difference r between the second planar surface 32b and the third planar surface 33b can be corrected and adjusted. In the rotational direction θy on the Y-axis, both of the level difference between the first planar surface 31b and the second planar surface 32b and the level difference between the first planar surface 31b and the third planar surface 33b can be corrected and adjusted. Moreover, in the rotational direction θz on the Z-axis, the level difference between the first bottom planar surface 38b and the second bottom planar surface 39b can be corrected and adjusted.

The eyepiece lens 15 and the housing 16 having high dimensional accuracy and less dimensional error of each portion can be obtained by using the mold thus formed to injection-mold the eyepiece lens and the first and second prisms described later on using the methacrylic resin (PMMA) or the like as the raw material, and to injection-mold the housing the glass-fiber reinforced polycarbonate or the like as the raw material. Accordingly, the eyepiece lens 15 and the housing 16 thus formed are used and the pair of rib portions 15b and 15c are inserted into the first and second longitudinal guide grooves 41 and 42 in the housing 16 so as to hold the pair of rib portions 15b and 15c by the first slit portion 28, so that the generation of clearance at the time of assembly can be restrained and highly accurate installation can be performed.

Embodiment 2

FIGS. 11 through 15 show a second embodiment of the present invention, in which the first prism 13 is applied as an optical component. The housing 16 is the same one described in the above mentioned embodiment, and the second slit portion 29 is arranged in the incident side light path 18 thereof. An open hole penetrating through the planar surface portion of the housing 16 in the vertical direction is arranged in the incident side light path 18, and the second slit portion 29 is arranged in upper and lower lateral walls 21b and 22b enclosing both sides of this open hole and in the partition wall 21d.

The first prism 13 has a pair of rib portions 55b and 55c similarly to the pair of rib portions 15b and 15c of the eyepiece lens 15 described above. As shown in FIGS. 11 and 12, the pair of rib portions 55b and 55c are inserted into the second slit portion 29 of the housing 16, and the first prism 13 is held and fixed in the housing 16 by holding the pair of rib portions 55b and 55c in this second slit portion 29.

Figure 13B:
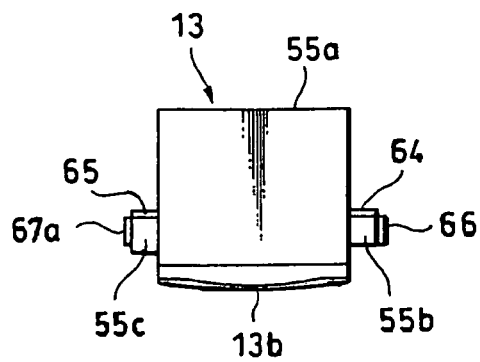
Figure 13D:
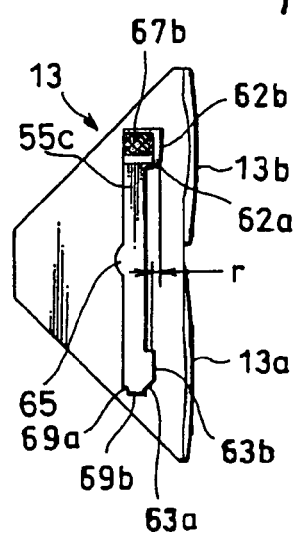
Figure 13A:
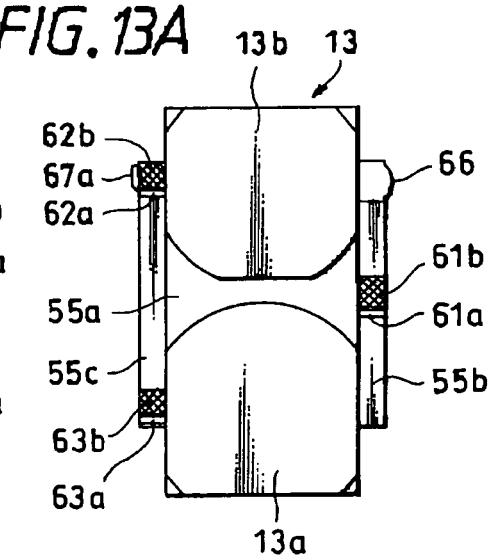
Figure 13E:
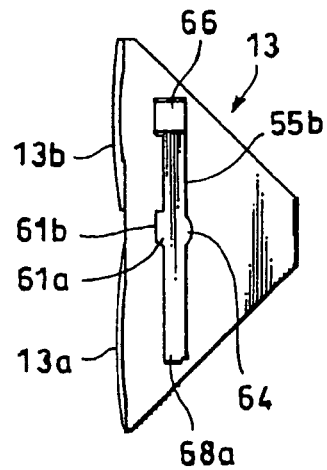
Figure 13C:
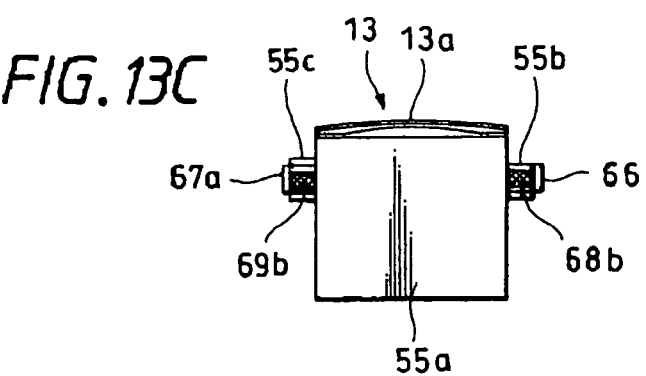

FIGS. 13A through 13E show the first prism 13, in which FIG. 13A is a front view; FIG. 13B is a plan view; FIG. 13C is a bottom plan view; FIG. 13D is a left side view; and FIG. 13 E is a right side view. The first prism 13 includes a prism main body 55a made of a right-angled prism and the pair of rib portions 55b and 55c arranged to project to both sides in the right and left directions of this prism main body 55a. The pair of rib portions 55b and 55c of the first prism 13 are extended in the direction parallel with the incident surface 13a and the exit surface 13b, and the bottom end is set close to the center of the incident surface 13a and the top end is set close to the center of the exit surface 13b.

A first convex portion 61a is arranged in the middle portion in the vertical direction on one side surface of the first rib portion 55b located on the right side (or the rib portion 55c on the left side) in FIG. 13A in the pair of rib portions 55b and 55c, a first planar surface 61b made of a planar surface extended in the direction parallel with the incident surface 13a and the like is formed on the front surface of this first convex portion 61a. Also, a second convex portion 62a and a third convex portion 63a are arranged in both end portions in the vertical direction on one side surface of the second rib portion 55c located on the left side (this may also be the rib portion 55b on the right side) in FIG. 13A. A second planar surface 62b and a third planar surface 63b which are made of planar surfaces extended in the parallel direction are formed on front surfaces of the second convex portion 62a and the third convex portion 63a, respectively.

The third planar surface 63b is set further inside than the second planar surface 62b, and the length (distance) from the center of the second rib portion 55c to the second planar surface 62b is set to become longer than the length (distance) from the center of the second rib portion 55c to the third planar surface 63b. Accordingly, a level difference r for setting a predetermined interval in the Z-axis direction is arranged between the second planar surface 62b and the third planar surface 63b.

Thus, three planar surfaces of the first planar surface 61b, the second planar surface 62b and the third planar surface 63b are disposed in a form of triangle with the prism main body 55a in between and also are in parallel with one another. These first planar surface 61b through the third planar surface 63b constitute reference surfaces on three locations, which are made parallel with an insertion direction to the second slit portion 29, of the first prism 13 showing the second embodiment of the optical component.

Further, a fourth convex portion 64 is arranged in an approximately middle portion in the vertical direction on the other side surface of the first rib portion 55b in the pair of rib portions 55b and 55c, and a fifth convex portion 65 is arranged in an approximately middle portion in the vertical direction on the other side surface of the second rib portion 55c. These fourth convex portion 64 and fifth convex portion 65 are set at positions of approximately the same height and are formed respectively as convex portions of semi-cylindrical form whose surface shapes are made into curved surfaces.

Furthermore, a sixth convex portion 66 projecting in the lateral direction (direction orthogonal to the light entering and light exiting) is arranged in an upper part of the first rib portion 55b. Similarly to the fourth convex portion 64, the sixth convex portion 66 is formed as a convex portion of semi-cylindrical form whose surface shape is made into a curved surface. A square-shaped eighth convex portion 68a projecting downward is arranged in a lower part of this first rib portion 55b. A first bottom planar surface 68b which is made of a planar surface extended in the vertical direction to a lateral planar surface 67b is formed on a lower surface of this eighth convex portion 68a.

Also, a seventh convex portion 67a projecting in the lateral direction on the side opposite to the sixth convex portion 66 is arranged in an upper part of the second rib portion 55c. A lateral planar surface 67b made of a planar surface extended in the direction orthogonal to the front surface of the prism main body 55a is formed on a lateral surface of this seventh convex portion 67a. A square-shaped ninth convex portion 69a projecting downward is arranged in a lower part of this second rib portion 55c. A second bottom planar surface 69b made of a planar surface extended in the vertical direction to the lateral planar surface 67b is formed on the lower surface of this ninth convex portion 69a.

The second slit portion 29 of the housing 16, in which the first prism 13 having such structure is inserted, has the structure as shown in FIGS. 11, 12, 14 and 15. Specifically, the second slit portion 29 has an open hole 52 penetrating through the planar surface portion 20 of the housing 16 in the vertical direction, and the lower surface of this open hole 52 is shut by an inclined surface portion 16a of the housing 16. In addition, the top surface of the open hole 52 is shut by an inclined surface portion 17b arranged in the cover 17.

FIG. 14A is a plan view showing the second slit portion 29 arranged in the housing 16 from the upper side; FIG. 14B is a K-K line sectional view of FIG. 14A; FIG. 14C is an L-L line sectional view of FIG. 14A; and FIG. 14D is an M-M line sectional view of FIG. 14A. Further, FIG. 15A is a front view showing a state where the second prism 13 is mounted in the second slit portion 29; FIG. 15B is an N-N line sectional view of FIG. 15A; and FIG. 15C is a P-P line sectional view of FIG. 15A.

As shown in FIGS. 14A through 14D, the second slit portion 29 is formed of a first longitudinal guide groove 71 of V-groove shape arranged in an inner surface ranging from the upper lateral wall 21b to the lower lateral wall 22b and a second longitudinal guide groove 72 of V-groove shape arranged in an inner surface of the partition wall 21d. A notch portion 71a is arranged on an opening side of the first longitudinal guide groove 71, and a notch portion 70b is arranged on an opening side of the second longitudinal guide groove 72. Accordingly, each top end of the first and second longitudinal guide grooves 71 and 72 is formed to position in approximately the center portion of the exit surface 13b.

The first and second longitudinal guide grooves 71 and 72 in the second slit portion 29 are formed such that a concave portion of the V-groove shape, in which a draft angle of suitable size is arranged on both surfaces of each groove, is made as a basic shape. Further, a first bottom reception surface 73a is arranged in the bottom of the first longitudinal guide groove 71, and a second bottom reception surface 73b is arranged in the bottom of the second longitudinal guide groove 72. Further, a planar surface portion having a certain size (area) is formed in an appropriate location on respective inclined surfaces of 74a, 74b and 75a, 75b of the first and second longitudinal guide grooves 71 and 72.

Next, the shape and structure of the second slit portion 29 are explained in detail. The first longitudinal guide groove 71 of the second slit portion 29 is illustrated in FIGS. 14A, 14B and 14C, and a first reception surface 77a is arranged in an approximately middle portion in the direction of the depth on the first inclined surface 74a located on the side near the second prism 14. The first planar surface 61b of the first prism 13 comes into contact with this first reception surface 77a as shown in FIG. 15C. The first reception surface 77a is set to be a little larger planar surface than the first planar surface 61b and also is formed in parallel with the direction of depth.

A fourth convex portion reception surface 77b is arranged similarly in an approximately middle portion in the direction of depth on the second inclined surface 74b of the first longitudinal guide groove 71, which is located on the side far from the second prism 14. As shown in FIG. 15C, the fourth convex portion 64 of the first prism 13 comes into contact with this fourth convex portion reception surface 77b. The fourth convex reception surface 77b is made into a planar surface of approximately the same size as the first reception surface 77a, and both the reception surfaces 77a and 77b are formed in parallel with each other. Further, a sixth convex portion reception surface 78, with which the sixth convex portion 66 of the first prism 13 comes into contact, is arranged on a lateral surface intersecting at approximately right angles to the first inclined surface 74a and the second inclined surface 74b in the first longitudinal guide groove 71, as shown in FIG. 15A. This sixth convex portion reception surface 78 is also formed in parallel with the direction of depth similarly to the first reception surface 77a and the like.

Further, the second longitudinal guide groove 72 of the second slit portion 29 is illustrated in FIGS. 14A, 14B and 14D; a second reception surface 79a is arranged on an opening side in the direction of depth on the first inclined surface 75a located on the side near the second prism 14; and a third reception surface 79b is arranged on the bottom surface side. As shown in FIG. 15B, a length (distance) from a center line Q of the second longitudinal guide groove 72, which also becomes the center line of the second rib portion 55c, to the second reception surface 79a is set longer than a length from this center line Q to the third reception surface 79b. Accordingly, a level difference R having a predetermined length (distance) is set between the second reception surface 79a and the third reception surface 79b as shown in FIG. 14D and FIG. 15B. This level difference R has the same length as the level difference r between the second planar surface 62b and the third planar surface 63b in the first prism 13.

The second planar surface 62b of the first prism 13 comes into contact with the second reception surface 79a of the second longitudinal guide groove 72, and the third planar surface 63b of the first prism 13 comes into contact with the third reception surface 79b. The second reception surface 79a is set to be a little larger planar surface than the second planar surface 62b, and similarly the third reception surface 79b is set to be a little larger planar surface than the third planar surface 63b. Further, the second reception surface 79a and the third reception surface 79b are formed in parallel in the depth direction, respectively.

Further, a fifth convex portion reception surface 79c is arranged in an approximately middle portion in the direction of depth on the second inclined surface 75b of the second longitudinal guide groove 72, which is located on the side far from the second prism 14. The fifth convex portion 65 of the first prism 13 comes into contact with this fifth convex portion reception surface 79c. The fifth convex portion reception surface 79c is made into a planar surface of approximately the same size as the fourth convex portion reception surface 77b and is formed in parallel with the second reception surface 79a and the third reception surface 79b. Moreover, a lateral reception surface 80, with which the seventh convex portion 67a of the first prism 13 comes into contact, is arranged as shown in FIG. 15A on a lateral surface intersecting at approximately right angles to the first inclined surface 75a and the second inclined surface 75b in the second longitudinal guide groove 72. Although this lateral reception surface 80 is extended in the direction orthogonal to the second reception surface 79a and the like, similarly this lateral reception surface is formed in parallel with the depth direction.

As shown in FIGS. 11 and 12, the first rib portion 55b of the first prism 13 is inserted in the first longitudinal guide groove 71 of the second slit portion 29, and the second rib portion 55c is inserted in the second longitudinal guide groove 72. Further, when the first prism 13 is inserted and guided to a predetermined position by both the longitudinal guide grooves 71 and 72, the lower surface of the first prism 13 which is an end of an insertion side comes into contact with the bottom of each of the longitudinal guide grooves 71 and 72. After that, the inner surface of the cover 17 comes into contact with a top surface of the first prism 13 by mounting the cover 17 on the housing 16. Accordingly, the first prism 13 composed of a triangular block body is set at a predetermined position in the incident side light path 18 and is installed fixedly in the housing 16 through the second slit portion 29.

At this time, the incident surface 13a of the first prism 13 is projected beneath the planar surface portion 20, and the exit surface 13b is projected above the planar surface portion 20. The incident surface 14a of the second prism 14 is made to oppose the exit surface 13b of this first prism 13, and the zoom adjustment lens 12 is made to oppose the incident surface 13a. The objective lens 5 is disposed in front of the zoom adjustment lens 12, and an open window 53 is arranged in a lower front wall 22a of the housing 16 in order to expose this objective lens 5 to the outside.

In this second embodiment, corresponding to the shape of the first prism 13, the planar surface portions are arranged at three locations on the inclined surfaces 74a and 75a of one side of the first and second longitudinal guide grooves 71 and 72, which oppose the front surface of the first prism 13, to be made into the first supporting surfaces, also the planar surface portions are arranged at two locations on the inclined surfaces 74b and 75b of the other side to be made into the second supporting surfaces. However, needless to say, the second supporting surfaces may be arranged on the inclined surfaces 74a and 75a of one side and the first supporting surfaces may be arranged on the inclined surfaces 74b and 75b of the other side.

The optical component retaining device including the above described first prism 13 and second slit portion 29 is used similarly to the eyepiece lens 15 described above. Specifically, the first prism 13 is installed by inserting the pair of rib portions 55b and 55c, which are arranged on both sides in the lateral direction in the prism main body 55a, into the pair of longitudinal guide grooves 71 and 72 of the second slit portion 29 arranged in the housing 16 and by holding the pair of rib portions 55b and 55c by the second slit portion 29. Further, the first prism 13 is positioned and fixed to a predetermined position of the housing 16 by mounting the cover 17 on the housing 16 and by depressing the upper part of the first prism 13 using this cover 17.

In this embodiment, the first reception surface 77a, the second reception surface 79a and the third reception surface 79b, and the fourth convex portion reception surface 77b, the fifth convex portion reception surface 79c, the sixth convex portion reception surface 78 and the lateral reception surface 80 are arranged in the second slit portion 29 of the housing 16, and the planar surfaces of suitable size made "without draft angle" and in parallel with the insertion direction of the first prism 13 are formed at a plurality of locations in these reception surfaces. In this case, the draft angle is necessary between the second reception surface 79a and the third reception surface 79b; however, the level difference R is arranged between the both reception surfaces 79a and 79b and it is made possible to take out the molded goods by means of this level difference R. Further, the first bottom reception surface 73a and the second bottom reception surface 73b are arranged in each bottom (lower surface in the direction of depth) of the first and second longitudinal guide grooves 71 and 72 in the second slit portion 29.

Such planar surfaces and convex portions that come into contact with each reception surface of the second slit portion 29 are arranged in the pair of rib portions 55b and 55c of the first prism 13 showing the second embodiment of the optical component. Specifically, the convex portions are arranged at nine locations from the first convex portion 61a to the ninth convex portion 69a in the pair of rib portions 55b and 55c, and the planar surfaces of three locations from the first planar surface 61b to the third planar surface 63b are arranged on outer surfaces of the convex portions of three locations from the first convex portion 61a to the third convex portions 63a among those nine convex portions. Further, the lateral planar surface 67b is arranged on an outer surface of the seventh convex portion 67a, and the first bottom planar surface 68b and the second bottom planar surface 69b are arranged on outer surfaces of the eighth convex portion 68a and the ninth convex portion 69a.

Furthermore, the level difference r (refer to FIG. 13D) of the same size corresponding to the level difference R of the second slit portion 29 is provided between the second planar surface 62b and third planar surface 63b in the second rib portion 55c. This level difference r is formed by making the distance (length) from the center of the second rib portion 55c to the second planar surface 62b shorter than the distance (length) from the center of the second rib portion 55c to the third planar surface 63b.

Thus, the first planar surface 61b of the first rib portion 55b comes into contact with the first reception surface 77a of the second slit portion 29; the second planar surface 62b of the second rib portion 55c comes into contact with the second reception surface 79a thereof; and the third planar surface 63b comes into contact with the third reception surface 79b thereof. The fourth convex portion 64 of the first rib portion 55b comes into contact with the fourth convex portion reception surface 77b of the second slit portion 29, and the fifth convex portion 65 of the second rib portion 55c comes into contact with the fifth convex portion reception surface 79c. Further, the sixth convex portion 66 of the first rib portion 55b comes into contact with the sixth convex portion reception surface 78 of the second slit portion 29, and the lateral planar surface 67b of the second rib portion 55c comes into contact with the lateral reception surface 80. Further, the first bottom planar surface 68b of the first rib portion 55b comes into contact with the first bottom reception surface 73a of the second slit portion 29, and the second bottom planar surface 69b of the second rib portion 55c comes into contact with the second bottom reception surface 73b of the second rib portion 55c.

The above described first planar surface 61b, second planar surface 62b, third planar surface 63b, lateral planar surface 67b, first bottom planar surface 68b and second bottom planar surface 69b are the ones which become the reference surfaces to fit the first prism 13 to each reception surface of the second slit portion 29. In addition, each circular-arc form convex portion of the fourth convex portion 64, the fifth convex portion 65 and the sixth convex portion 66 is arranged in order to absorb rattling of the first prism 13 by the light press-fitting or the like at the time of assembly.

The above described first reception surface 77a, second reception surface 79a and third reception surface 79b of the above described second slit portion 29 come in contact with planar surfaces from the first planar surface 61b to the third planar surface 63b which are the reference surfaces, constituting the first supporting surfaces to support those planar surfaces. Further, the above described fourth convex portion reception surface 77b and fifth convex portion reception surface 79c of the second slit portion 29 come in contact with the fourth convex portion 64 and the fifth convex portion 65, constituting the second supporting surfaces to support those portions.

The first prism 13 having such structure is manufactured in the same manner as the above described first embodiment. Specifically, in the cavity of the mold for the first prism 13 to be injection-molded, the positions of respective planar surfaces corresponding to the first planar surface 61b, the second planar surface 62b, the third planar surface 63b and the lateral planar surface 80 which are arranged in the pair of rib portions 55b and 55c of the first prism 13 are suitably corrected to set with the predetermined high positional accuracy. Further, the each corresponding planar surface of the cavity corresponding to each planar surface of the pair of rib portions 55b and 55c is adjusted by performing finishing work in the axis direction of X-axis, Y-axis or Z-axis in the similar coordinates axes to X-axis, Y-axis and Z-axis shown in FIG. 6 to obtain the high positional accuracy in those axis directions and to obtain the high inclination accuracy in the rotational directions centering on an X-axis, a Y-axis and a Z-axis.

After the corresponding planar surfaces are thus corrected to finish up respectively to the predetermined dimensions, the corresponding concave surfaces in the cavity, which are made of the concave surfaces of circular-arc shape corresponding to the fourth convex portion 64, the fifth convex portion 65 and the sixth convex portion 66 in the pair of rib portions 55b and 55c, are adjusted by performing finishing work on the above described coordinates axes to obtain the predetermined high positional accuracy and inclination accuracy. Since the above described planar surfaces and convex portions in the cavity of the mold for the first prism thus adjusted are comparatively small area portions formed partly in the pair of rib portions 55b and 55c, the adjustment work to set the positional accuracy and inclination accuracy thereof high can comparatively be performed with ease.

Further, similarly to the above described first slit portion 28, with respect to the second slit portion 29 of the housing 16, in the cavity of the mold for injection molding thereof the positions of respective planar surfaces corresponding to the first reception surface 77a, the second reception surface 79a, the third reception surface 79b, the fourth convex portion reception surface 77b, the fifth convex portion reception surface 79c, the sixth convex portion reception surface 78 and the lateral reception surface 80 which are arranged in the second slit portion 29 of V-groove form are suitably corrected to be set with the predetermined high positional accuracy, respectively. Further, each planar surface of the cavity corresponding to each planar surface of the second slit portion 29 is adjusted by performing finishing work in the axis direction of X-axis, Y-axis or Z-axis on the coordinates axes consisting of X-axis, Y-axis and Z-axis to obtain the high positional accuracy in those axis directions and to obtain the high inclination accuracy in the rotational directions centering on X-axis, Y-axis and Z-axis.

Since the above described planar surfaces in the cavity of the mold for the housing thus adjusted are comparatively small area portions formed partly in the second slit portion 29 similarly to the first slit portion 28, the adjustment work to set the positional accuracy and inclination accuracy thereof high can be performed comparatively with ease, similarly. Relations between an adjusting method and a correction surface in each cavity of such mold for the first prism and mold for the housing are similar to those described in Table 1.

The first prism 13 having high dimensional accuracy and less dimensional error of each portion can be obtained by using the mold thus formed and by injection-molding the first prism 13 using the methacrylic resin (PMMA) or the like as the raw material, for example. Accordingly, using the first prism 13 and the housing 16 thus formed, inserting the pair of rib portions 55b and 55c in the first and second longitudinal guide grooves 71 and 72 in the second slit portion 29 of the housing 16, and holding the pair of rib portions 55b and 55c by the second slit portion 29 enable the generation of clearance to be restrained at the time of assembly and enable highly accurate installation to be performed.

As heretofore explained, according to the present invention, since a plurality of small planar surfaces are arranged as the reference surfaces in positions where a draft angle is required in the cavity of the mold used for manufacturing optical components by injection molding, the positional accuracy of the reference surface can be adjusted with high accuracy and with ease through the finishing work by the correction after the injection molding while the dimensional accuracy of the draft angle is not strictly required. Accordingly, an optical component and a housing which have high positional accuracy of the reference surfaces can be obtained; a visibility adjustment mechanism can be omitted; the installation accuracy is raised to make adjustment unnecessary; and such optical component can be installed in the housing with high accuracy. Furthermore, since an additional slide mechanism in a mold, an additional number of parts and the like are not required, cost increase in mold and in components is not incurred, and the manufacturing process can be simplified and cost reduction can be achieved.

The present invention is not limited to the embodiments described above and shown in the accompanied drawings, but various modifications can be taken without departing from the sprit and scope of this invention. In the above described embodiments, although the explanation is made to the embodiments in which the eyepiece lens and prism of the optical view finder used for an image pick-up device such as a video camera or a still camera are held by and fixed to the housing, the present invention can also be applied to other optical component retaining devices than the above, such as a device for retaining an optical component, for example, a color separation filter, a reflection mirror and the like.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical component retaining device, comprising:
   an optical component having a pair of rib portions, each having a pair of side surfaces with each side surface having respective convex portions;
   a housing having a slit portion formed of a tapered groove where said pair of rib portions are inserted, in which said pair of rib portions is held by said slit portion to retain said optical component in said housing;

planar reference surfaces extended in a parallel direction with said insertion direction at three locations on said respective convex portions on one side surface of said pair of rib portions in the light axis direction of said optical component, and pressing portions at a plurality of locations on said respective convex portions on the other side surface of the pair of rib portions in said light axis direction;

first supporting surfaces extended in the parallel direction with said insertion direction and arranged at three locations on one side surface of said slit portion corresponding to the reference surfaces of said three locations to come in contact with said reference surfaces, and second supporting surfaces extended in the parallel direction with said insertion direction and arranged at a plurality of locations on the other side surface of the slit portion to come in contact with said pressing portions, wherein the reference surfaces of two locations among said reference surfaces of three locations are arranged on both ends of one rib portion of said pair of rib portions in the direction in which the rib portion extends and said pressing portions are arranged in the middle of the direction in which said rib portion extends, wherein an inclined surface is arranged between said reference surfaces of two locations of one rib portion, wherein each of said reference surfaces of two locations of one rib portion is connected with said inclined surface by a step portion, and wherein said housing is formed by injection molding and said reference surfaces are formed in parallel with the insertion direction of said optical component.

2. An optical component retaining device according to claim 1, wherein the reference surfaces of two locations among said reference surfaces of three locations are arranged on both ends of one rib portion of said pair of rib portions in the direction in which the rib portion extends and one of said pressing portions is arranged in the middle of the direction in which said one rib portion extends.

3. An optical component retaining device according to claim 2, wherein a level difference is provided between those reference surfaces of two locations when said reference surfaces of two locations overlap each other in the direction in which said rib portion extends and said level difference is provided such that with respect to distance from the center of said rib portion, the distance to an opening side of said slit portion is made longer than the distance to a back side thereof.

4. An optical component retaining device according to claim 1, wherein said optical component is any one of a lens, a prism, a filter and a mirror, which includes an optical component main body to transmit or reflect light and said pair of rib portions arranged on both sides with a light axis of said optical component main body in between.

5. An optical component retaining device according to claim 1, wherein said pressing portions have a semi-cylindrical shape, a semispherical shape, a conical shape, a pyramid shape, a truncated conical shape, a truncated pyramid shape, a cylindrical shape or a polygonal cylindrical shape.

6. An optical component retaining device according to claim 1, wherein said optical component is any one of a lens, a prism, a filter and a mirror, which is used for an optical view finder.

7. An optical component comprising:

an optical component main body which transmits or reflects light and a pair of rib portions arranged on both sides with the light axis of said optical component main body in between, each of said rib portions having a pair of side surfaces, each of which has respective convex portions, wherein planar reference surfaces extended in a parallel direction with a direction in which the rib portions extend are arranged at three locations on respective convex portions on one side surface of said pair of rib portions in the light axis direction of said optical component main body, and pressing portions are arranged at a plurality of locations on respective convex portions on the other side surface of said pair of rib portions, wherein the reference surfaces of two locations among said reference surfaces of three locations are arranged on both ends of one rib portion of said pair of rib portions in the direction in which the rib portion extends and said pressing portions are arranged in the middle of the direction in which said rib portion extends, wherein an inclined surface is arranged between said reference surfaces of two locations of one rib portion, wherein each of said reference surfaces of two locations of one rib portion is connected with said inclined surface by a step portion, and wherein said housing is formed by injection molding and said reference surfaces are formed in parallel with the insertion direction of said optical component.

8. An optical component according to claim 7, wherein the reference surfaces of two locations among said reference surfaces of three locations are arranged on both ends of one rib portion of said pair of rib portions in the direction in which the rib portion extends and one of said pressing portions is arranged in the middle of the direction in which said one rib portion extends.

9. An optical component according to claim 8, wherein a level difference is provided between those reference surfaces of two locations when said reference surfaces of two locations overlap each other in the direction in which said rib portion extends and said level difference is provided such that with respect to distance from the center of said rib portion, the distance to an opening side of said slit portion is made longer than the distance to a back side thereof.

10. An optical component according to claim 7, wherein said optical component is any one of a lens, a prism, a filter and a mirror.

11. An optical component according to claim 7, wherein said pressing portions have a semi-cylindrical shape, a semispherical shape, a conical shape, a pyramid shape, a truncated conical shape, a truncated pyramid shape, a cylindrical shape or a polygonal cylindrical shape.

12. A housing including a slit portion formed of a tapered groove where a pair of rib portions are inserted, said tapered groove having a draft angle relative to an insertion direction to accommodate an injection molding process, said housing comprising:

first supporting surfaces extended in a parallel direction with said insertion direction at three locations on one side surface of said slit portion and second supporting surfaces extended in the parallel direction with said insertion direction at a plurality of locations on the other side surface of said slit portion, wherein the first supporting surfaces of two locations among said first supporting surfaces of three locations are arranged on both ends of said slit portion in said insertion direction and said second supporting surfaces are arranged in the middle in said insertion direction, wherein an inclined surface is arranged between said first supporting surfaces of two locations of one groove portion, wherein each of said supporting surfaces of two locations of one groove portion is connected with said inclined surface by a step portion, and wherein said housing is formed by injection molding and said supporting surfaces are formed in parallel with the insertion direction of said optical component.

13. A housing according to claim 12, wherein
the first supporting surfaces of two locations among said first supporting surfaces of three locations are arranged on both ends of said slit portion in said insertion direction and said second supporting surfaces are arranged in the middle in said insertion direction.

14. A housing according to claim 13, wherein
a level difference is provided between those first supporting surfaces of two locations when said first supporting surfaces of two locations overlap each other in said insertion direction and said level difference is provided such that with respect to distance from the center of said rib portion, the distance to an opening side of said slit portion is made longer than the distance to a back side thereof.

* * * * *